(12) United States Patent
Barnett et al.

(10) Patent No.: US 11,946,465 B2
(45) Date of Patent: *Apr. 2, 2024

(54) PACKING SEAL ASSEMBLY

(71) Applicant: Kerr Machine Co., Sulphur, OK (US)

(72) Inventors: Christopher Todd Barnett, Stratford, OK (US); Micheal Cole Thomas, Ardmore, OK (US); Kelcy Jake Foster, Ardmore, OK (US); Nicholas Son, Davis, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,757

(22) Filed: Aug. 10, 2022

(65) Prior Publication Data
US 2023/0047066 A1 Feb. 16, 2023

Related U.S. Application Data

(60) Provisional application No. 63/312,541, filed on Feb. 22, 2022, provisional application No. 63/310,269,
(Continued)

(51) Int. Cl.
F04B 39/12 (2006.01)
F04B 1/0538 (2020.01)
(Continued)

(52) U.S. Cl.
CPC .......... F04B 39/122 (2013.01); F04B 1/0538 (2013.01); F04B 19/22 (2013.01);
(Continued)

(58) Field of Classification Search
CPC ...... F04B 39/121; F04B 1/0538; F04B 19/22; F04B 27/00; F04B 39/122; F04B 53/164;
(Continued)

(56) References Cited

U.S. PATENT DOCUMENTS 677,137 A 6/1901 Leavitt
1,316,539 A 9/1919 Ford
(Continued)

FOREIGN PATENT DOCUMENTS

CN 207974953 U 10/2018
EP 2494140 B1 5/2017
(Continued)

OTHER PUBLICATIONS

Bolt Science, The Use of Two Nuts to Prevent Self Loosening, Jan. 9, 2015, https://www.boltscience.com/pages/twonuts.htm (Year: 2015).

Primary Examiner — Charles G Freay
Assistant Examiner — David N Brandt
(74) Attorney, Agent, or Firm — Tomlinson McKinstry, P.C.

(57) ABSTRACT

A fluid end assembly comprising a plurality of fluid end sections positioned in a side-by-side relationship. Each fluid end section comprises a housing having a bore formed therein for housing a reciprocating plunger. Fluid is prevented from leaking around the plunger by a packing seal assembly. The packing seal assembly comprises one and only one packing seal.

13 Claims, 17 Drawing Sheets

Related U.S. Application Data filed on Feb. 15, 2022, provisional application No. 63/304,070, filed on Jan. 28, 2022, provisional application No. 63/301,524, filed on Jan. 21, 2022, provisional application No. 63/246,099, filed on Sep. 20, 2021, provisional application No. 63/240,889, filed on Sep. 4, 2021, provisional application No. 63/235,251, filed on Aug. 20, 2021, provisional application No. 63/233,241, filed on Aug. 14, 2021.

(51) Int. Cl.

| | | |
|---|---|---|
| *F04B 19/22* | (2006.01) | |
| *F04B 23/06* | (2006.01) | |
| *F04B 27/00* | (2006.01) | |
| *F04B 39/14* | (2006.01) | |
| *F04B 53/02* | (2006.01) | |
| *F04B 53/16* | (2006.01) | |
| *F04B 53/22* | (2006.01) | |
| *F16J 15/26* | (2006.01) | |

(52) U.S. Cl.
CPC ............ *F04B 27/00* (2013.01); *F04B 39/121* (2013.01); *F04B 53/164* (2013.01); *F16J 15/26* (2013.01); *F04B 23/06* (2013.01); *F04B 39/14* (2013.01); *F04B 53/02* (2013.01); *F04B 53/22* (2013.01)

(58) Field of Classification Search
CPC .......... F04B 23/06; F04B 39/14; F04B 53/02; F04B 53/16; F04B 53/22; F16L 55/1141; F16J 15/26
See application file for complete search history.

(56) References Cited

U.S. PATENT DOCUMENTS

| | | |
|---|---|---|
| 1,317,294 A | 9/1919 | Hildebrand |
| 1,662,725 A | 3/1928 | Toney, Jr. |
| 1,822,682 A | 9/1931 | Weiger |
| 1,836,498 A | 12/1931 | Gustav |
| 2,495,880 A | 1/1950 | Volpin |
| 2,545,506 A | 3/1951 | Walsh |
| 2,713,522 A | 7/1955 | Petch |
| 2,756,960 A | 7/1956 | Church |
| 2,771,846 A | 11/1956 | Horton et al. |
| 2,783,810 A | 3/1957 | Wrigley |
| 2,828,696 A | 4/1958 | Wright |
| 2,856,857 A | 10/1958 | Saalfrank |
| 2,957,422 A | 10/1960 | Loeber |
| 3,005,412 A | 10/1961 | Camp |
| 3,053,500 A | 9/1962 | Atkinson |
| 3,146,724 A | 9/1964 | Cornelsen |
| 3,152,787 A | 10/1964 | Timmons |
| 3,173,648 A | 3/1965 | McGuire et al. |
| 3,179,121 A | 4/1965 | Bredtschneider et al. |
| 3,244,424 A | 4/1966 | Cope |
| 3,257,952 A | 6/1966 | McCormick |
| 3,301,197 A | 1/1967 | Dodson |
| 3,309,013 A | 3/1967 | Bauer |
| 3,373,695 A | 3/1968 | Yohpe |
| 3,427,988 A | 2/1969 | Redman et al. |
| 3,463,527 A | 8/1969 | Baker |
| 3,474,808 A | 10/1969 | Elliott |
| 3,508,849 A | 4/1970 | Weber |
| 3,589,387 A | 6/1971 | Raymond |
| 3,679,332 A | 7/1972 | Yohpe |
| 3,702,624 A | 11/1972 | Fries |
| 3,746,483 A | 7/1973 | Hindel et al. |
| 3,756,229 A | 9/1973 | Ollivier |
| 3,776,558 A | 12/1973 | Maurer et al. |
| 3,887,305 A | 6/1975 | Ito |
| 4,047,850 A | 9/1977 | Berthelot |
| 4,170,214 A | 10/1979 | Gill et al. |
| 4,174,194 A | 11/1979 | Hammelmann |
| 4,277,229 A * | 7/1981 | Pacht ................... F04B 53/164 417/454 |
| 4,363,463 A | 12/1982 | Moon, Jr. |
| 4,388,050 A | 6/1983 | Schuller |
| 4,467,703 A | 8/1984 | Redwine et al. |
| 4,470,771 A | 9/1984 | Hall et al. |
| 4,494,415 A | 1/1985 | Elliston |
| 4,518,329 A | 5/1985 | Weaver |
| 4,520,837 A | 6/1985 | Cole et al. |
| 4,616,983 A | 10/1986 | Hanafi |
| 4,768,933 A | 9/1988 | Stachowiak |
| 4,771,801 A | 9/1988 | Crump et al. |
| 4,773,833 A | 9/1988 | Wilkinson et al. |
| 4,778,347 A | 10/1988 | Mize |
| 4,861,241 A | 8/1989 | Gamboa et al. |
| 4,878,815 A | 11/1989 | Stachowiak |
| 4,891,241 A | 1/1990 | Hashimoto et al. |
| 4,948,349 A | 8/1990 | Koiwa |
| 4,984,970 A | 1/1991 | Eickmann |
| 5,059,101 A | 10/1991 | Valavaara |
| 5,061,159 A | 10/1991 | Pryor |
| 5,073,096 A | 12/1991 | King et al. |
| 5,088,521 A | 2/1992 | Johnson |
| 5,127,807 A | 7/1992 | Eslinger |
| 5,145,340 A | 9/1992 | Allard |
| 5,207,242 A | 5/1993 | Daghe et al. |
| 5,226,445 A | 7/1993 | Surjaatmadja |
| 5,230,363 A | 7/1993 | Winn, Jr. et al. |
| 5,253,987 A | 10/1993 | Harrison |
| 5,299,921 A | 4/1994 | Ritcher |
| 5,302,087 A | 4/1994 | Pacht |
| 5,362,215 A | 11/1994 | King |
| 5,370,148 A | 12/1994 | Shafer |
| 5,507,219 A | 4/1996 | Stogner |
| 5,524,902 A | 6/1996 | Cornette |
| 5,605,449 A | 2/1997 | Reed |
| 5,636,975 A | 6/1997 | Tiffany et al. |
| D383,053 S | 9/1997 | Schrader et al. |
| 5,799,953 A * | 9/1998 | Henderson ........... F16J 15/3236 277/567 |
| 5,848,880 A | 12/1998 | Helmig |
| 6,164,318 A | 12/2000 | Dixon |
| 6,167,959 B1 | 1/2001 | Bassinger et al. |
| 6,231,323 B1 | 5/2001 | Jezek |
| 6,257,626 B1 | 7/2001 | Campau |
| 6,382,940 B1 | 5/2002 | Blume |
| 6,419,459 B1 | 7/2002 | Sibbing |
| 6,544,012 B1 | 4/2003 | Blume |
| 6,641,112 B2 | 11/2003 | Antoff et al. |
| 6,910,871 B1 | 6/2005 | Blume |
| 7,140,211 B2 | 11/2006 | Tremblay |
| 7,168,440 B1 | 1/2007 | Blume |
| 7,186,097 B1 | 3/2007 | Blume |
| 7,290,560 B2 | 11/2007 | Orr et al. |
| 7,296,591 B2 | 11/2007 | Moe et al. |
| 7,335,002 B2 | 2/2008 | Vicars |
| 7,506,574 B2 * | 3/2009 | Jensen .................. F04B 53/007 417/454 |
| 7,513,483 B1 | 4/2009 | Blume |
| 7,513,759 B1 | 4/2009 | Blume |
| 7,591,450 B1 | 9/2009 | Blume |
| D616,966 S | 6/2010 | Angell |
| 7,789,133 B2 | 9/2010 | McGuire |
| 7,828,053 B2 | 11/2010 | McGuire et al. |
| 7,845,413 B2 | 12/2010 | Shampine et al. |
| D631,142 S | 1/2011 | Angell |
| 7,866,346 B1 | 1/2011 | Walters |
| 7,963,502 B2 | 6/2011 | Lovell et al. |
| 8,083,504 B2 | 12/2011 | Williams et al. |
| 8,100,407 B2 | 1/2012 | Stanton et al. |
| 8,141,849 B1 | 3/2012 | Blume |
| 8,240,634 B2 | 8/2012 | Jarchau et al. |
| 8,317,498 B2 | 11/2012 | Gambier et al. |
| 8,360,094 B2 | 1/2013 | Steinbock et al. |
| 8,365,754 B2 | 2/2013 | Riley et al. |
| 8,528,462 B2 | 9/2013 | Pacht |
| 8,701,546 B2 | 4/2014 | Pacht |
| 9,010,412 B2 | 4/2015 | McGuire |

(56) References Cited

U.S. PATENT DOCUMENTS

| | | | |
|---|---|---|---|
| D731,035 S | 6/2015 | Lo Cicero | |
| D737,497 S | 8/2015 | Burgess et al. | |
| 9,188,121 B1 | 11/2015 | Dille | |
| D748,228 S | 1/2016 | Bayyouk et al. | |
| 9,260,933 B2 | 2/2016 | Artherholt et al. | |
| 9,291,274 B1 | 3/2016 | Blume | |
| 9,328,745 B2 | 5/2016 | Bartlok et al. | |
| 9,371,919 B2 | 6/2016 | Forrest et al. | |
| 9,416,887 B2 | 8/2016 | Blume | |
| 9,435,454 B2 | 9/2016 | Blume | |
| 9,470,226 B2 | 10/2016 | Johnson et al. | |
| 9,534,473 B2 | 1/2017 | Morris et al. | |
| 9,631,739 B2 | 4/2017 | Belshan et al. | |
| D787,029 S | 5/2017 | Bayyouk et al. | |
| 9,670,922 B2 | 6/2017 | Pacht | |
| 9,732,746 B2 | 8/2017 | Chandrasekaran et al. | |
| 9,791,082 B2 | 10/2017 | Baxter et al. | |
| 9,822,894 B2 | 11/2017 | Bayyouk et al. | |
| D806,241 S | 12/2017 | Swinney et al. | |
| 10,184,470 B2 | 1/2019 | Barnett, Jr. | |
| 10,221,847 B2 | 3/2019 | Dyer | |
| 10,240,597 B2 | 3/2019 | Bayyouk et al. | |
| 10,352,321 B2 | 7/2019 | Byrne et al. | |
| 10,393,113 B2 | 8/2019 | Wagner | |
| 10,677,380 B1 | 6/2020 | Surjaatmadja et al. | |
| 10,711,778 B2 | 7/2020 | Buckley | |
| 10,760,567 B2 | 9/2020 | Salih et al. | |
| 10,767,773 B2 | 9/2020 | Lee | |
| 10,871,227 B1 | 12/2020 | Belshan et al. | |
| 11,162,479 B2 | 11/2021 | Thomas | |
| 11,261,863 B2 | 3/2022 | Beisel et al. | |
| 11,391,374 B1 * | 7/2022 | Ellisor | F04B 53/164 |
| 2002/0166588 A1 | 11/2002 | Dean | |
| 2004/0170507 A1 | 9/2004 | Vicars | |
| 2004/0234404 A1 | 11/2004 | Vicars | |
| 2006/0002806 A1 | 1/2006 | Baxter et al. | |
| 2006/0027779 A1 | 2/2006 | McGuire et al. | |
| 2008/0006089 A1 | 1/2008 | Adnan et al. | |
| 2008/0008605 A1 | 1/2008 | Bauer et al. | |
| 2008/0093361 A1 | 4/2008 | Kennedy et al. | |
| 2008/0181798 A1 | 7/2008 | Folk | |
| 2008/0279705 A1 | 11/2008 | Wago et al. | |
| 2008/0279706 A1 | 11/2008 | Gambier et al. | |
| 2009/0194717 A1 | 8/2009 | Jarchau et al. | |
| 2010/0129249 A1 | 5/2010 | Bianchi et al. | |
| 2010/0243255 A1 | 9/2010 | Luharuka et al. | |
| 2011/0079302 A1 | 4/2011 | Hawes | |
| 2011/0173814 A1 | 7/2011 | Patel | |
| 2011/0189040 A1 | 8/2011 | Vicars | |
| 2011/0206546 A1 | 8/2011 | Vicars | |
| 2011/0206547 A1 | 8/2011 | Kim et al. | |
| 2011/0236238 A1 | 9/2011 | Cordes et al. | |
| 2012/0063936 A1 | 3/2012 | Baxter et al. | |
| 2012/0141308 A1 | 6/2012 | Saini et al. | |
| 2012/0187321 A1 | 7/2012 | Small | |
| 2012/0272764 A1 | 11/2012 | Pendleton | |
| 2013/0020521 A1 | 1/2013 | Byrne | |
| 2013/0045123 A1 | 2/2013 | Roman et al. | |
| 2013/0105175 A1 | 5/2013 | Mailand et al. | |
| 2013/0112074 A1 | 5/2013 | Small | |
| 2013/0202458 A1 | 8/2013 | Byrne et al. | |
| 2013/0263932 A1 | 10/2013 | Baxter et al. | |
| 2013/0319220 A1 * | 12/2013 | Luharuka | F04B 53/166 92/165 R |
| 2014/0127062 A1 | 5/2014 | Buckley et al. | |
| 2014/0196570 A1 | 7/2014 | Small et al. | |
| 2014/0196883 A1 | 7/2014 | Artherholt et al. | |
| 2014/0348677 A1 | 11/2014 | Moeller et al. | |
| 2015/0071803 A1 | 3/2015 | Huang | |
| 2015/0084335 A1 | 3/2015 | Farrell et al. | |
| 2015/0132152 A1 | 5/2015 | Lazzara | |
| 2015/0132157 A1 | 5/2015 | Whaley et al. | |
| 2015/0144826 A1 | 5/2015 | Bayyouk et al. | |
| 2015/0147194 A1 | 5/2015 | Foote | |
| 2015/0159647 A1 | 6/2015 | Dille | |
| 2015/0211641 A1 | 7/2015 | Pacht | |
| 2015/0219096 A1 | 8/2015 | Jain et al. | |
| 2015/0300332 A1 | 10/2015 | Kotapish et al. | |
| 2016/0025082 A1 | 1/2016 | Bryne et al. | |
| 2016/0123313 A1 | 5/2016 | Simmons | |
| 2016/0160848 A1 | 6/2016 | Toppings et al. | |
| 2016/0281699 A1 | 9/2016 | Gnessin et al. | |
| 2016/0369792 A1 | 12/2016 | Wagner | |
| 2017/0002947 A1 | 1/2017 | Bayyouk et al. | |
| 2017/0089473 A1 | 3/2017 | Nowell et al. | |
| 2017/0204852 A1 | 7/2017 | Barnett, Jr. | |
| 2017/0211565 A1 | 7/2017 | Morreale | |
| 2017/0218951 A1 | 8/2017 | Graham et al. | |
| 2018/0017173 A1 | 1/2018 | Nowell et al. | |
| 2018/0045187 A1 | 2/2018 | Nagel et al. | |
| 2018/0058447 A1 | 3/2018 | Foster | |
| 2018/0313456 A1 | 11/2018 | Bayyouk et al. | |
| 2019/0011051 A1 | 1/2019 | Yeung | |
| 2019/0017503 A1 * | 1/2019 | Foster | F04B 1/145 |
| 2019/0032685 A1 | 1/2019 | Foster | |
| 2019/0049052 A1 | 2/2019 | Shuck | |
| 2019/0063427 A1 | 2/2019 | Nowell et al. | |
| 2019/0120389 A1 | 4/2019 | Foster et al. | |
| 2019/0128104 A1 | 5/2019 | Graham et al. | |
| 2019/0136842 A1 | 5/2019 | Nowell et al. | |
| 2019/0145391 A1 | 5/2019 | Davids | |
| 2019/0178243 A1 * | 6/2019 | Nowell | F04B 53/007 |
| 2019/0277279 A1 | 9/2019 | Byrne et al. | |
| 2019/0277341 A1 | 9/2019 | Byrne et al. | |
| 2019/0368619 A1 | 12/2019 | Barnett et al. | |
| 2020/0182240 A1 * | 6/2020 | Nowell | F16J 15/184 |
| 2020/0191146 A1 | 6/2020 | Rinaldi et al. | |
| 2020/0232455 A1 * | 7/2020 | Blume | F04B 53/02 |
| 2020/0347843 A1 * | 11/2020 | Mullins | F04B 53/22 |
| 2020/0362678 A1 | 11/2020 | Lesko | |

FOREIGN PATENT DOCUMENTS

| | | |
|---|---|---|
| WO | 2014144113 A2 | 9/2014 |
| WO | 2017096488 A1 | 6/2017 |
| WO | 2017139348 A1 | 8/2017 |
| WO | 2018197458 A1 | 11/2018 |

* cited by examiner

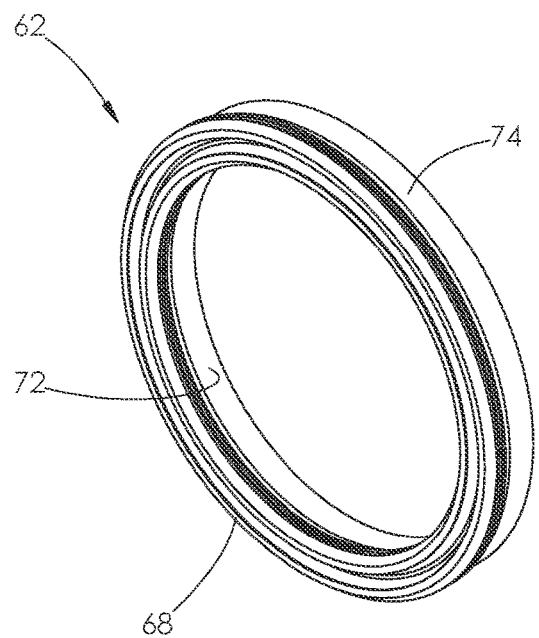
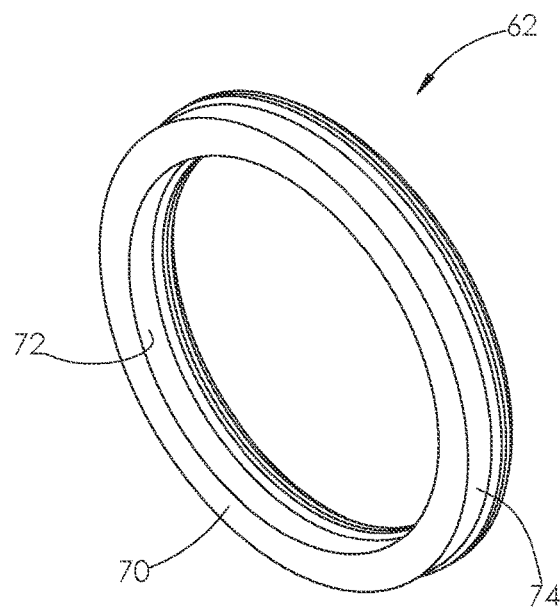
FIG. 5
FIG. 6
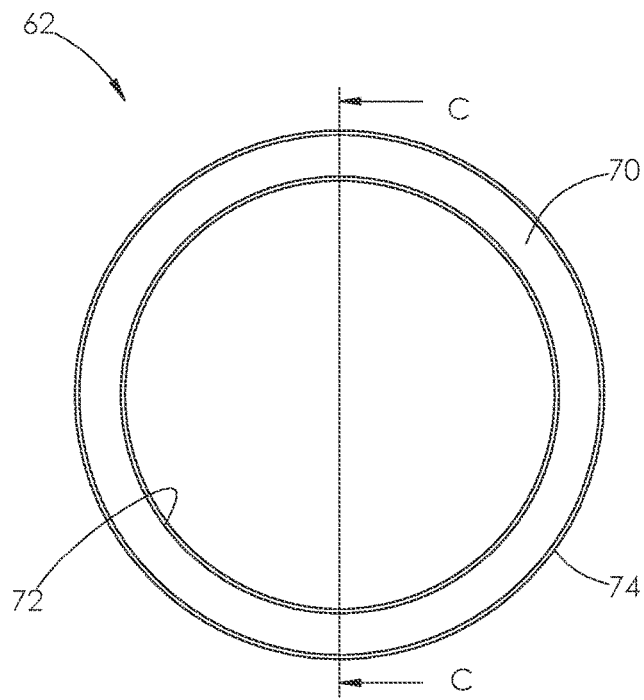
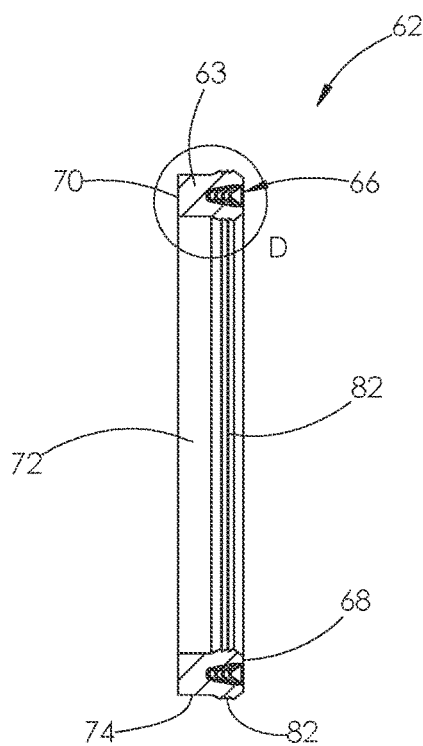
FIG. 7
FIG. 8

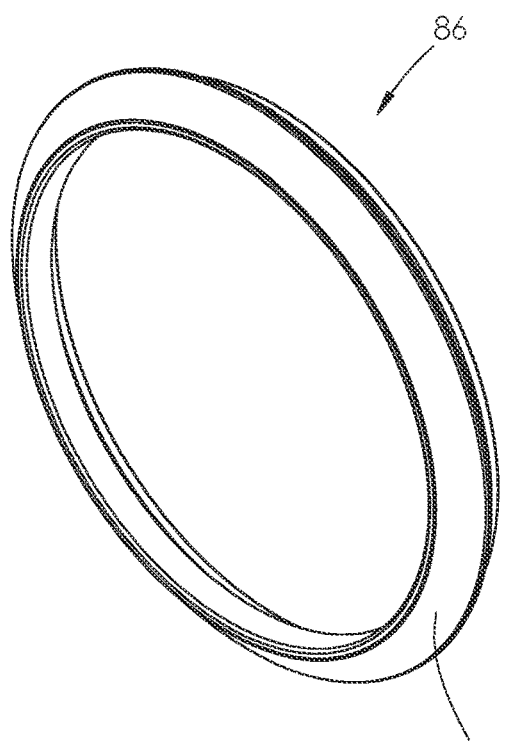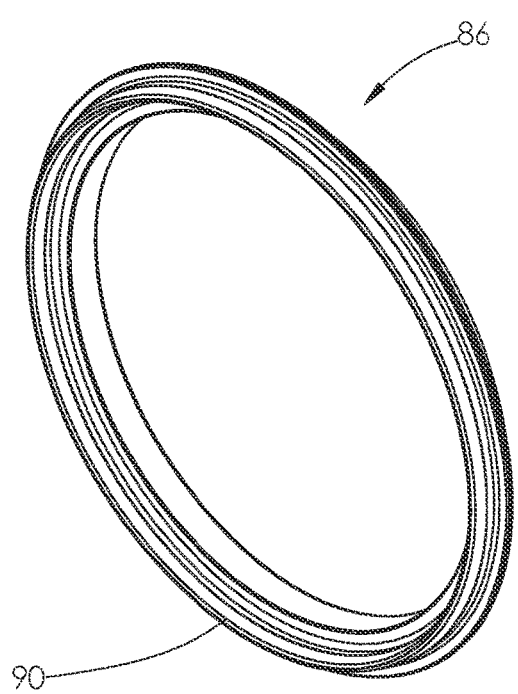
FIG. 10   FIG. 11
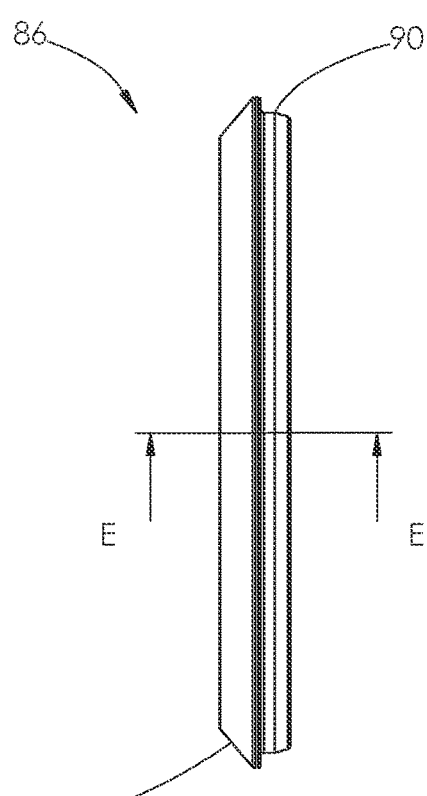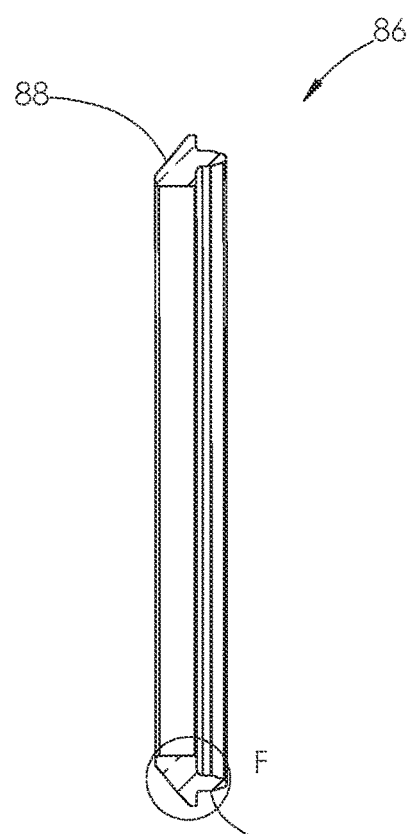
FIG. 12   FIG. 13

PACKING SEAL ASSEMBLY

SUMMARY

The present invention is directed to a fluid end comprising a housing having a longitudinal axis and opposed front and rear surfaces joined by an outer intermediate surface, and a bore formed within the housing and interconnecting the front and rear surfaces. The bore extends along the longitudinal axis of the housing. The housing further comprises a retainer attached to the rear surface of the housing by a plurality of fasteners, a reciprocating plunger disposed within the bore and the retainer, and one and only one packing seal installed within the housing and engaged an outer surface of the plunger.

The present invention is also directed to an apparatus comprising a packing seal assembly. The packing seal assembly is configured to be installed within a housing having a horizontal bore formed therein. The packing seal assembly comprises one and only one packing seal configured to surround and engage an outer surface of a reciprocating plunger. The one and only one packing seal has opposed front and rear surfaces joined by inner and outer surfaces and comprising an energizing component. The energizing component is installed within the seal and is configured to expand the inner and outer intermediate surfaces during operation. The packing seal assembly further comprises a wear ring surrounding the one and only one packing seal, and an annular component installed within the housing and comprising a projecting portion, the projecting portion engaging the energizing component.

BRIEF DESCRIPTION OF THE DRAWINGS

FIG. 5 is a front perspective view of the packing seal shown in FIGS. 2-4 and 18-20.

FIG. 6 is a rear perspective view of the packing seal shown in FIG. 5.

FIG. 7 is a rear elevational view of the packing seal shown in FIG. 5.

FIG. 8 is a cross-sectional view of the packing seal shown in FIG. 7, taken along line C-C.

FIG. 10 is a front perspective view of the support element shown in FIGS. 2-4 and 18-20.

FIG. 11 is a rear perspective view of the support element shown in FIG. 10.

FIG. 12 is a side elevational view of the support element shown in FIG. 10.

FIG. 13 is a cross-sectional view of the support element shown in FIG. 12, taken along line E-E.

DETAILED DESCRIPTION

High pressure reciprocating pumps typically comprise a power end assembly attached to a fluid end assembly. Fluid end assemblies are typically used in oil and gas operations to deliver highly pressurized corrosive and/or abrasive fluids to piping leading to the wellbore. Fluid end assemblies are attached to power ends typically run by engines. The power end comprises a crankshaft configured to reciprocate a plurality of plungers within the fluid end assembly to pump fluid throughout the fluid end.

Fluid may be pumped throughout the fluid end assembly at pressures that range from 5,000-15,000 pounds per square inch (psi). However, the pressure may reach up to 22,500 psi. Power ends typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends collectively deliver about 4,200 gallons per minute or 100 barrels per minute to the wellbore. The present invention improves the performance and life of the various components included in the fluid end assembly.

Figure 1:
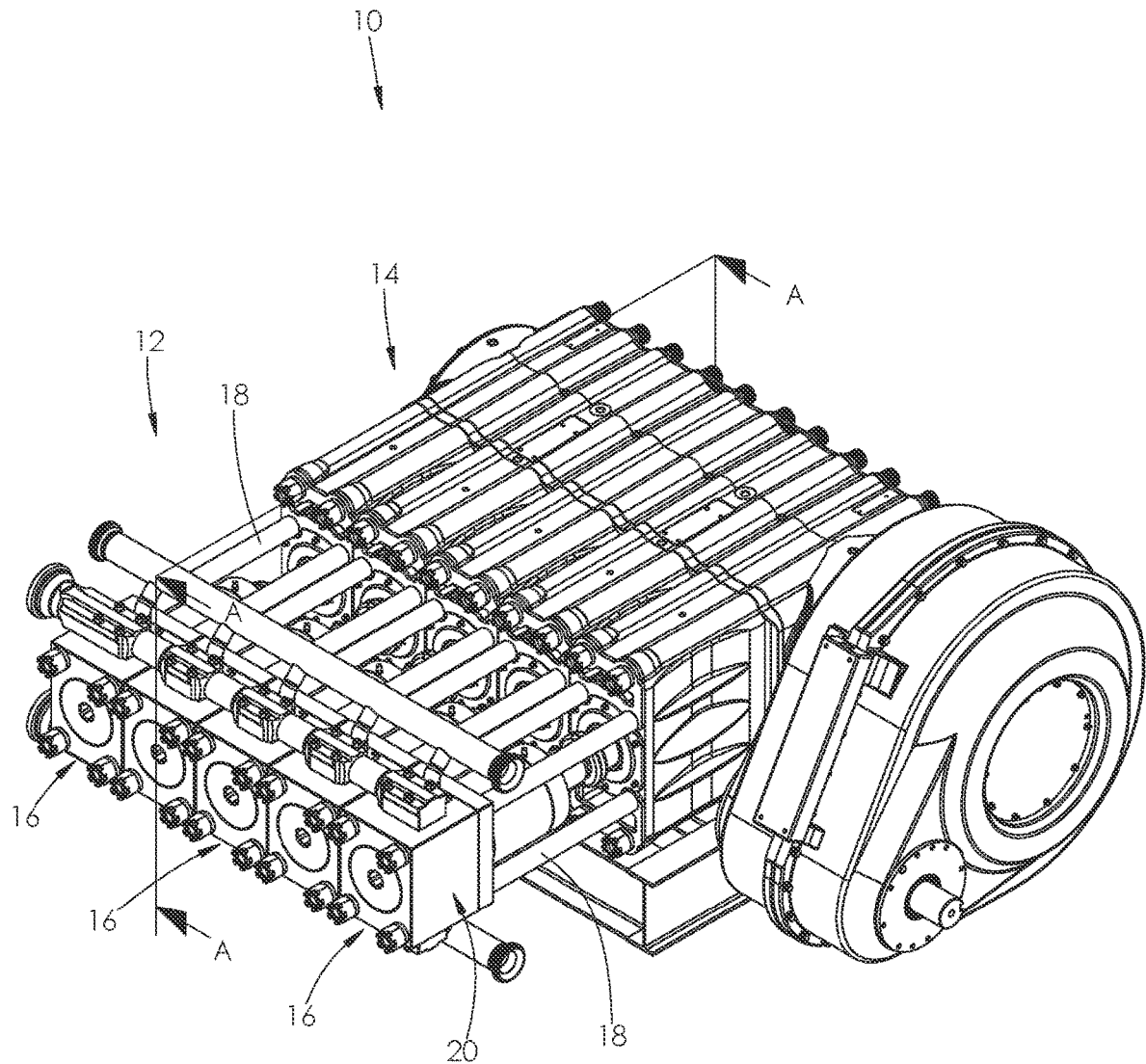
FIG. 1 is a perspective view of one embodiment of a high pressure pump.

Turning now to FIG. 1, one embodiment of a high pressure pump 10 is shown. The pump 10 comprises a fluid end assembly 12 joined to a power end assembly 14. The power end assembly 14 is described in more detail in U.S. patent application Ser. No. 17/884,691, authored by Keith, et al., and filed on Aug. 10, 2022, the entire contents of which are incorporated herein by reference. In alternative embodiments, the fluid end assembly 12 may be attached to other power end designs known in the art.

Continuing with FIG. 1, the fluid end assembly 12 comprises a plurality of individual fluid ends, or fluid end sections 16 positioned in a side-by-side relationship. Each fluid end section 16 is attached to the power end assembly 14 using a plurality of stay rods 18.

Figure 18:
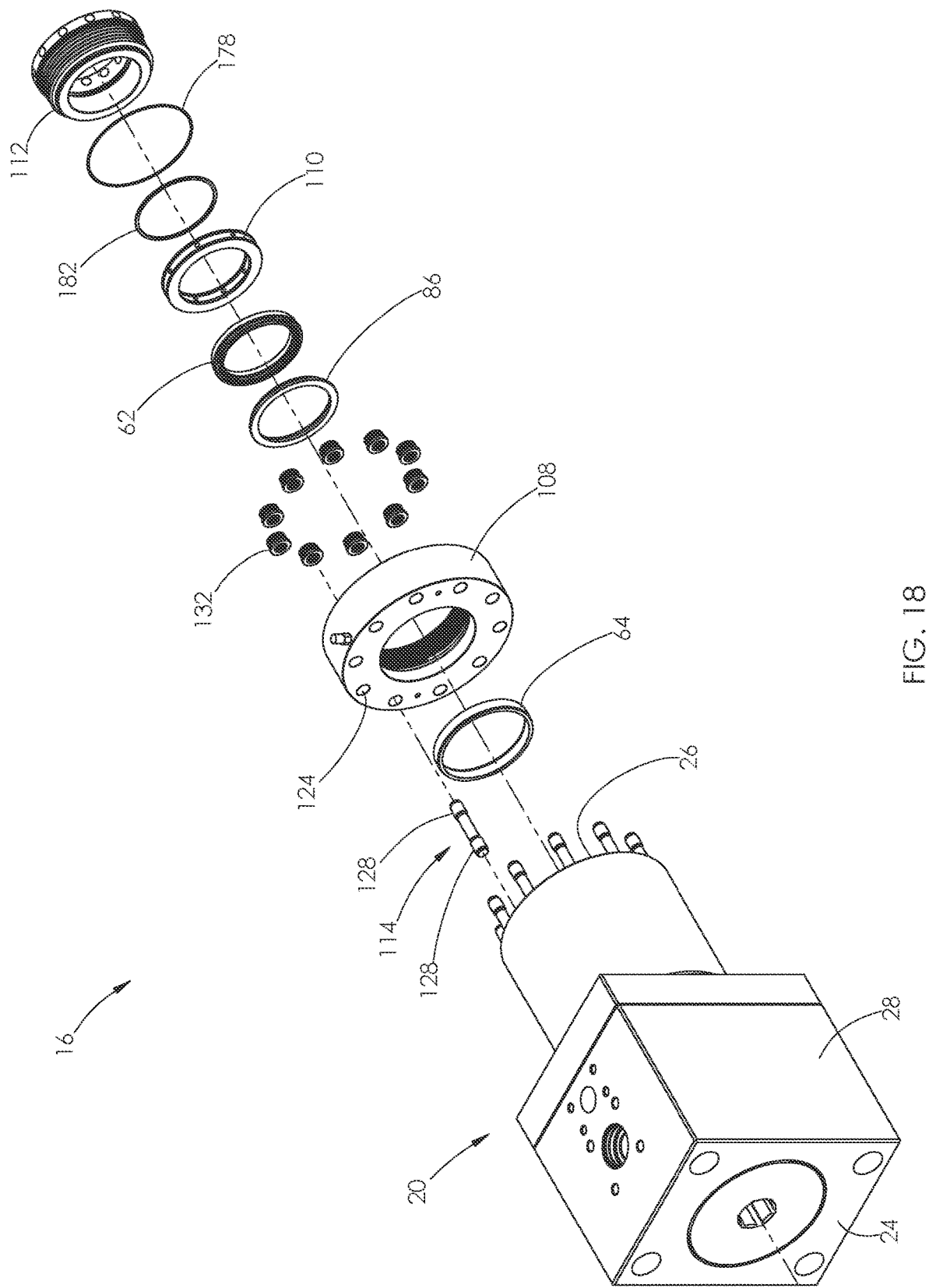
FIG. 18 is a front perspective and partially exploded view of one of the fluid end sections shown in FIG. 1.
Figure 19:
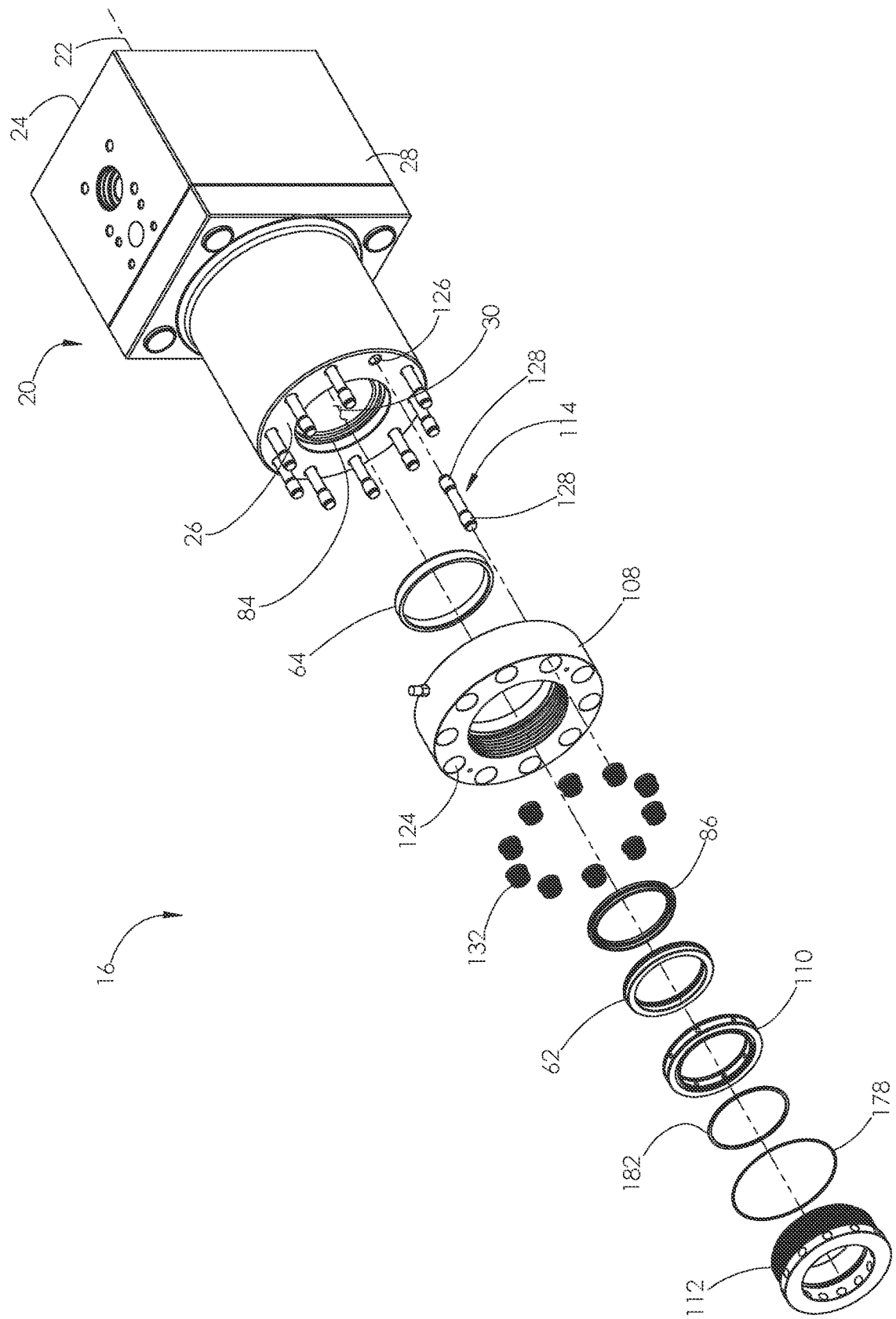
FIG. 19 is a rear perspective and partially exploded view of the fluid end section shown in FIG. 18.
Figure 20:
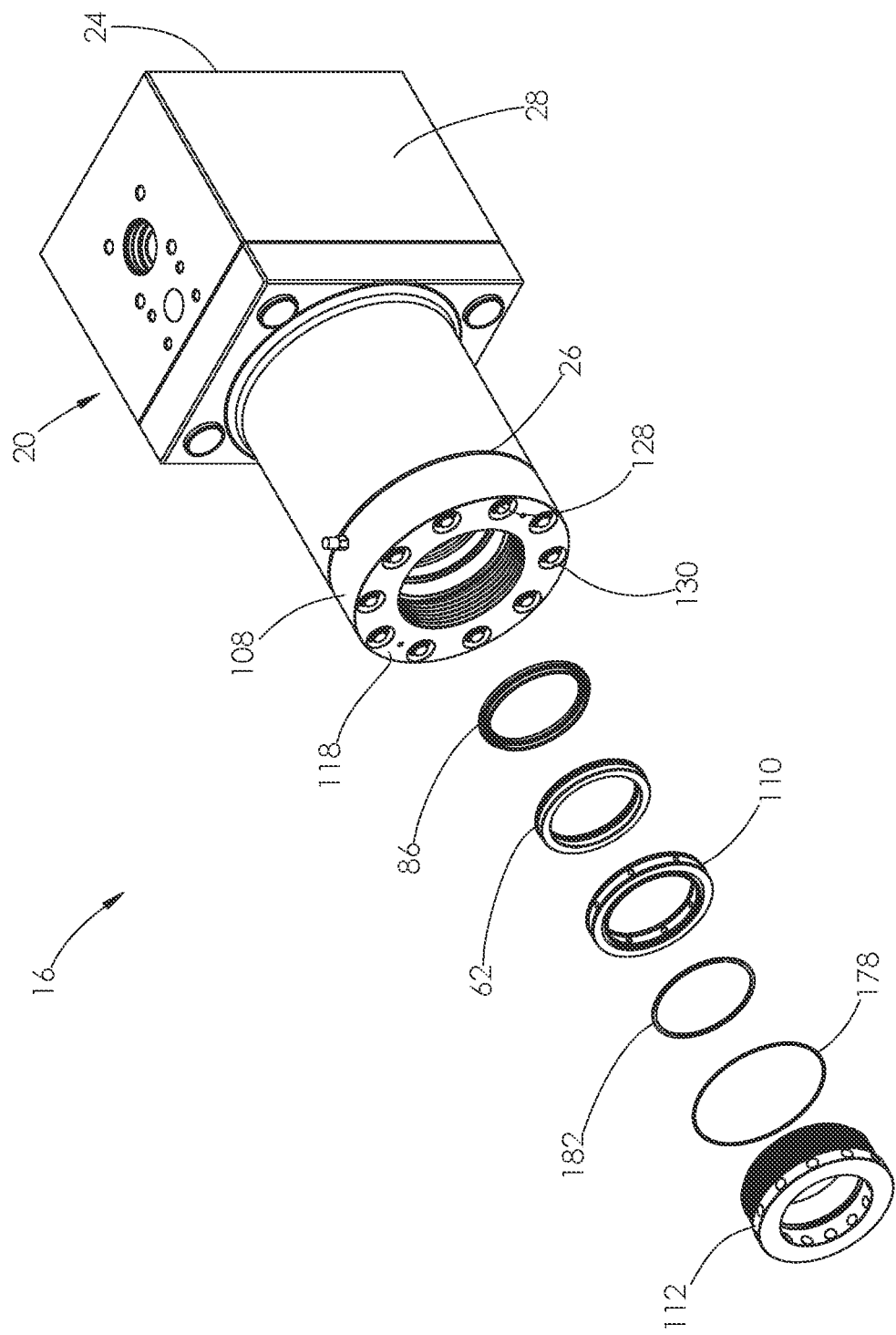
FIG. 20 is the rear perspective and partially exploded view of the fluid end section shown in FIG. 19, but fewer components are shown exploded.
Figure 21:
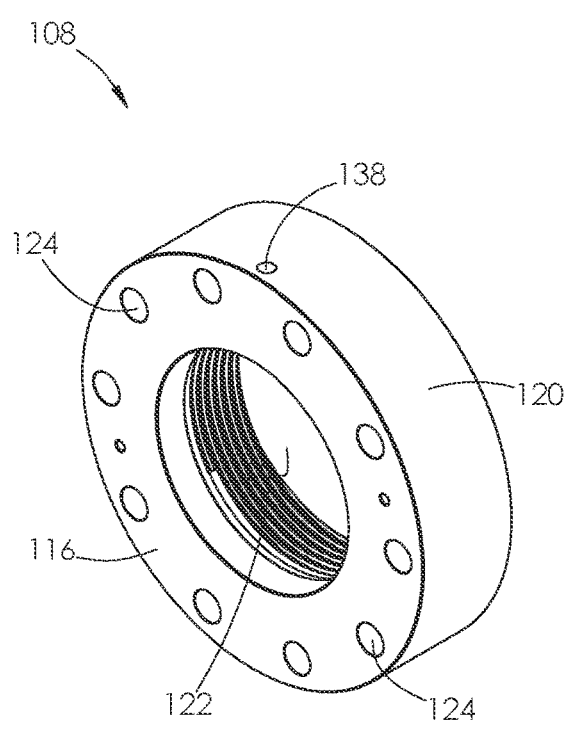
FIG. 21 is a front perspective view of the rear retainer shown in FIGS. 2-4 and 18-20.
Figure 22:
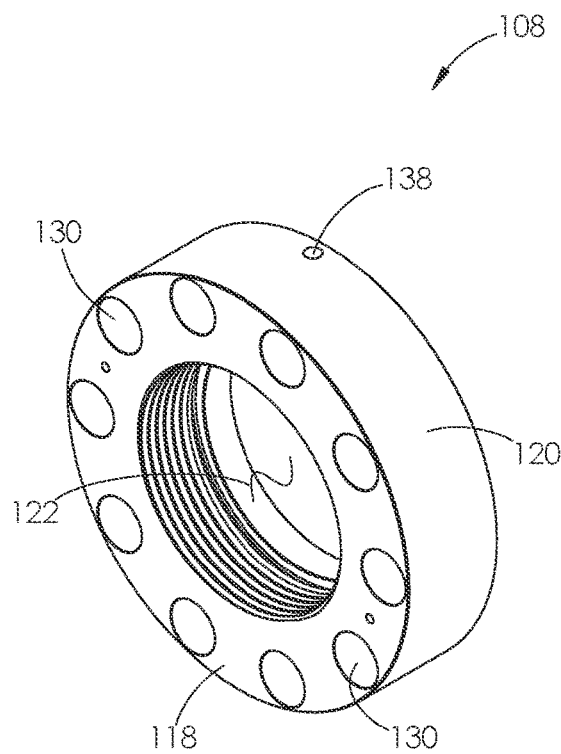
FIG. 22 is a rear perspective view of the rear retainer shown in FIG. 21.
Figure 23:
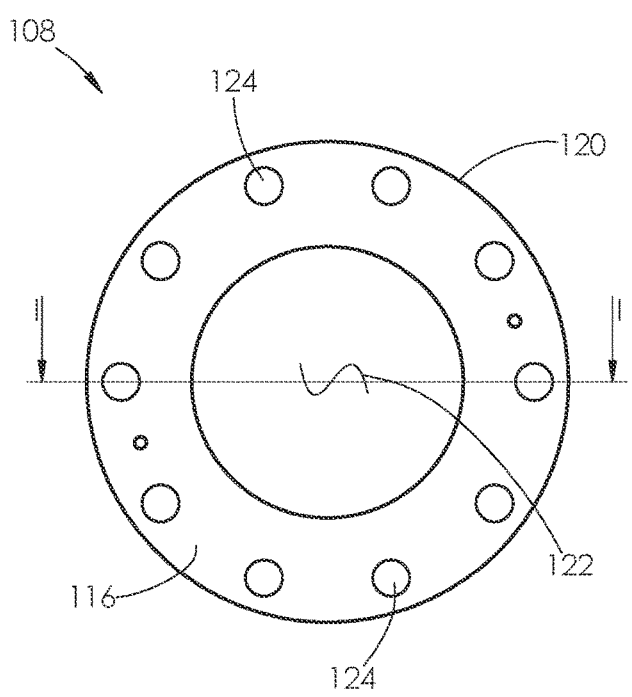
FIG. 23 is a front elevational view of the rear retainer shown in FIG. 21.

Turning to FIGS. 18-20, each fluid end section 16 comprises a housing 20 having a longitudinal axis 22 and opposed front and rear surfaces 24 and 26 joined by an outer intermediate surface 28 and a horizontal bore 30 formed therein, as shown in FIG. 19. The horizontal bore 30 interconnects the front and rear surfaces 24 and 26 of the housing 20. The housing 20 comprises multiple pieces joined together by the stay rods 18, as shown in FIG. 1.

Figure 2:
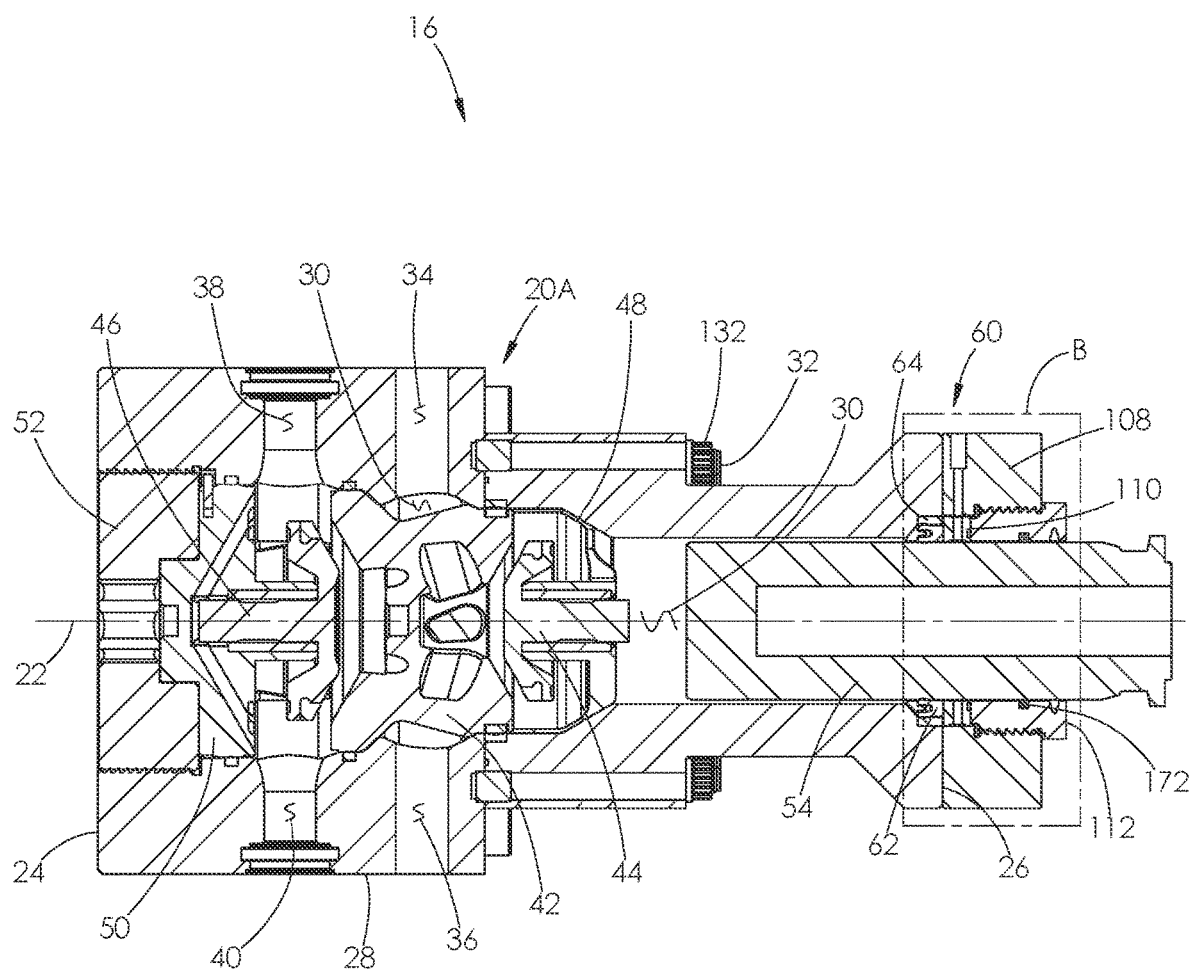
FIG. 2 is a cross-sectional view of the fluid end assembly shown in FIG. 1, taken along line A-A, but a different embodiment of a fluid end housing is shown.
Figure 3:
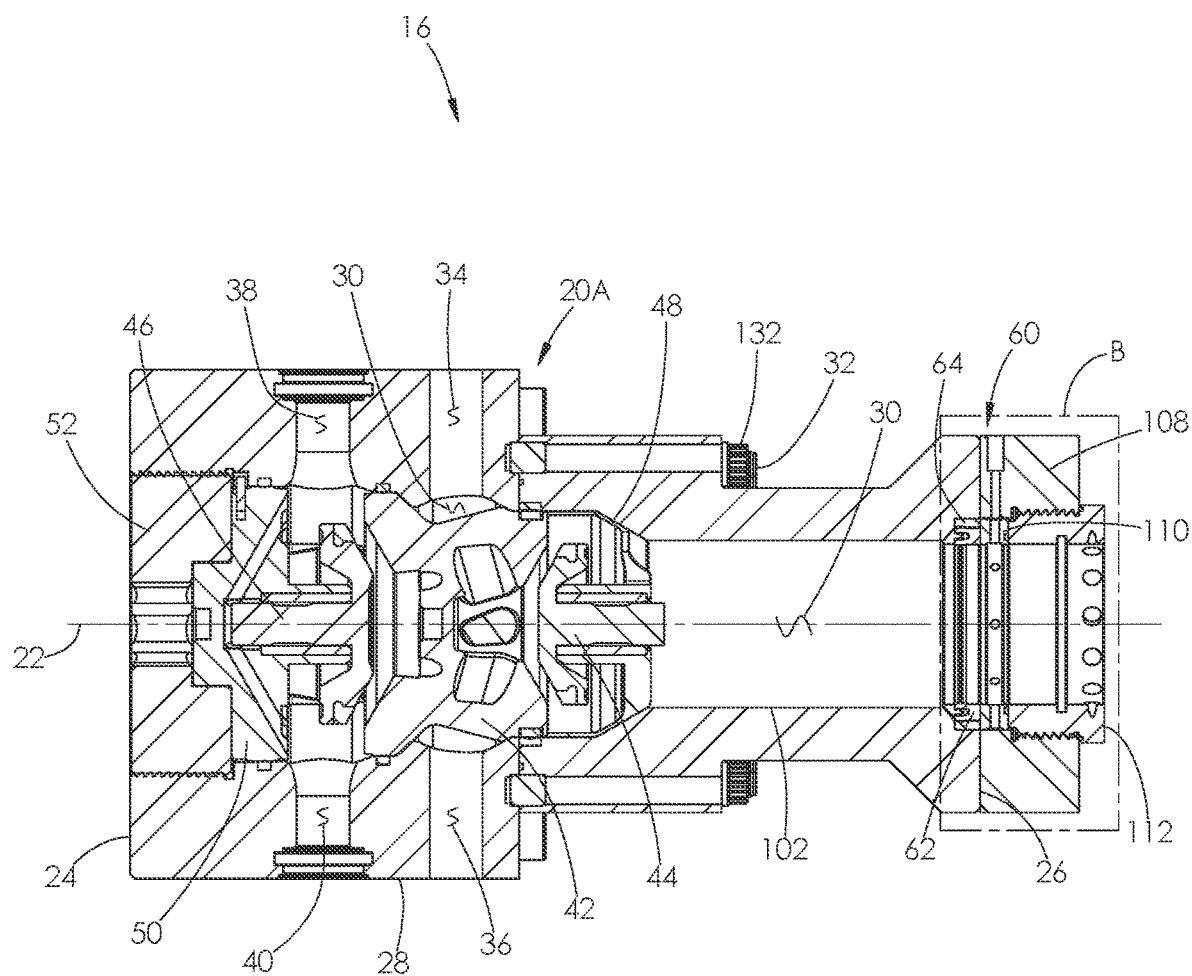
FIG. 3 is the cross-sectional view of the fluid end assembly shown in FIG. 2, but the plunger has been removed.
Figure 3A:
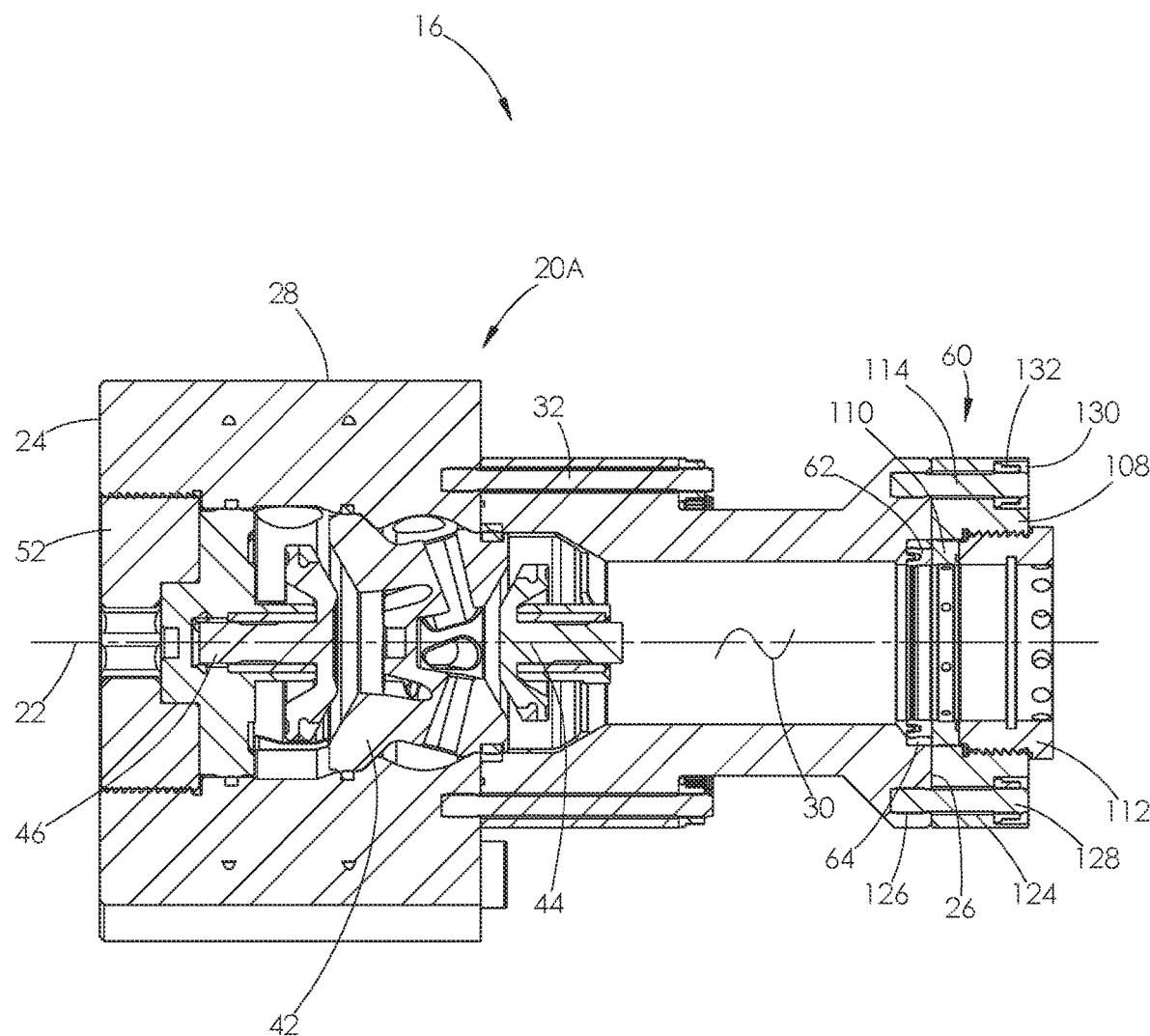
FIG. 3A is the cross-sectional view of the fluid end assembly shown in FIG. 3, but the cross-section is taken along a different axis.

Turning to FIGS. 2-3A, another embodiment of a housing 20A is shown. Like the housing 20, the housing 20A comprises a longitudinal axis 22 and opposed front and rear surfaces 24 and 26 joined by an outer intermediate surface 28 and a horizontal bore 30 formed therein. In contrast to the housing 20, the housing 20A comprises multiple sections joined together by fasteners 32. In alternative embodiments, the housing 20 or 20A may be of single-piece construction.

Continuing with FIGS. 2-3A, fluid enters the housing 20A through upper and lower suction bores 34 and 36. Fluid exits the housing 20A through upper and lower discharge bores 38 and 4o. Fluid is routed throughout the housing 20A by a fluid routing plug 42 and suction and discharge valves 44 and 46. Movement of the valves 44 and 46 is guided by a suction valve guide 48 and a discharge plug 5o. The front surface 24 of the housing 20A is sealed by a front retainer 52.

Continuing with FIG. 2, a reciprocating plunger 54 is installed within the horizontal bore 30 and projects from the rear surface 26 of the housing 20A. As the plunger 54 retracts from the housing 20A, fluid is pulled from the suction bores 34 and 36 into the horizontal bore 3o. As the plunger 54 extends into the housing 20A, the plunger 54 forces fluid towards the discharge bores 38 and 4o. While not specifically shown herein, the housing 20, shown in FIGS. 1 and 18-20, uses the same inner components as the housing 20A and operates in the same manner as the housing 20A. The construction of the housing 20 and 20A and their above mentioned inner components are described in more detail in U.S. patent application Ser. No. 17/844,712, authored by Thomas et al., and filed on Aug. 10, 2022, the entire contents of which are incorporated herein by reference.

In traditional fluid ends, fluid is prevented from leaking from the rear surface of the housing by a plunger packing installed within the housing and surrounding the plunger. The plunger packing comprises a plurality of packing seals stacked on top of one another. A tight seal is created by compressing the plurality of stacked seals together longitudinally. During operation, the packing seals require continuous maintenance to make sure they are adequately compressed and sealing against the plunger. Over time, the components of the plunger packing wear against the walls of the housing, causing erosion and eventual failure of the housing.

Continuing with FIGS. 2-4, and 18-20, the present application discloses a packing seal assembly 60 that comprises one and only one packing seal 62. By using one and only packing seal 62, a much smaller surface area of the housing 20A or 20 is subject to potential wear from the seal 62. Further, the single packing seal 62 is much easier to install than a plurality of packing seals used with a traditional plunger packing. As will be described in more detail herein, only one packing seal 62 is needed because the packing seal 62 comprises an energizing component 66. The energizing component 66 expands the packing seal 62 during operation, ensuring a tight seal against an outer surface of the plunger 54.

Turning to FIGS. 5-9, traditional packing seals are solid and comprise only an elastomeric body. The packing seal 62 comprises the energizing component 66 installed within an elastomeric body 63. The body 63 is annular and has opposed front and rear surfaces 68 and 70 joined by inner and outer intermediate surfaces 72 and 74. The energizing component 66 is installed within the front surface 68 of the packing seal 62 and is configured to expand radially when compressed longitudinally. Such expansion causes the inner intermediate surface 72 of the packing seal 62 to tightly seal against the outer surface of the plunger 54, and the outer intermediate surface 74 to tightly seal against the walls of the housing 20A or 20 or another component installed therein, as shown for example in FIG. 2.

Continuing with FIGS. 2-4, 18, and 19, one example of another component installed within the housing 20A or 20 is a wear ring 64. The wear ring 64 is shown installed within the housing 20A and surrounding the packing seal 62 in FIGS. 2-4. The wear ring 64 is positioned between the walls of the housing 20A or 20 and the packing seal 62 and is configured to protect the walls of the housing 20A or 20 from wear from the packing seal 62 during operation. The wear ring 64 is annular and is a made of a harder and more wear resistant material than the housing 20A or 20. For example, if the housing 20A or 20 is made of steel, the wear ring 64 may be made of tungsten carbide. Another example of another component installed within the housing 20A or 20 may be a stuffing box or sleeve known in the art. The stuffing box or sleeve may be installed within the housing 20A or 20 and the packing seal 62 installed within the stuffing box or sleeve.

Figure 9:
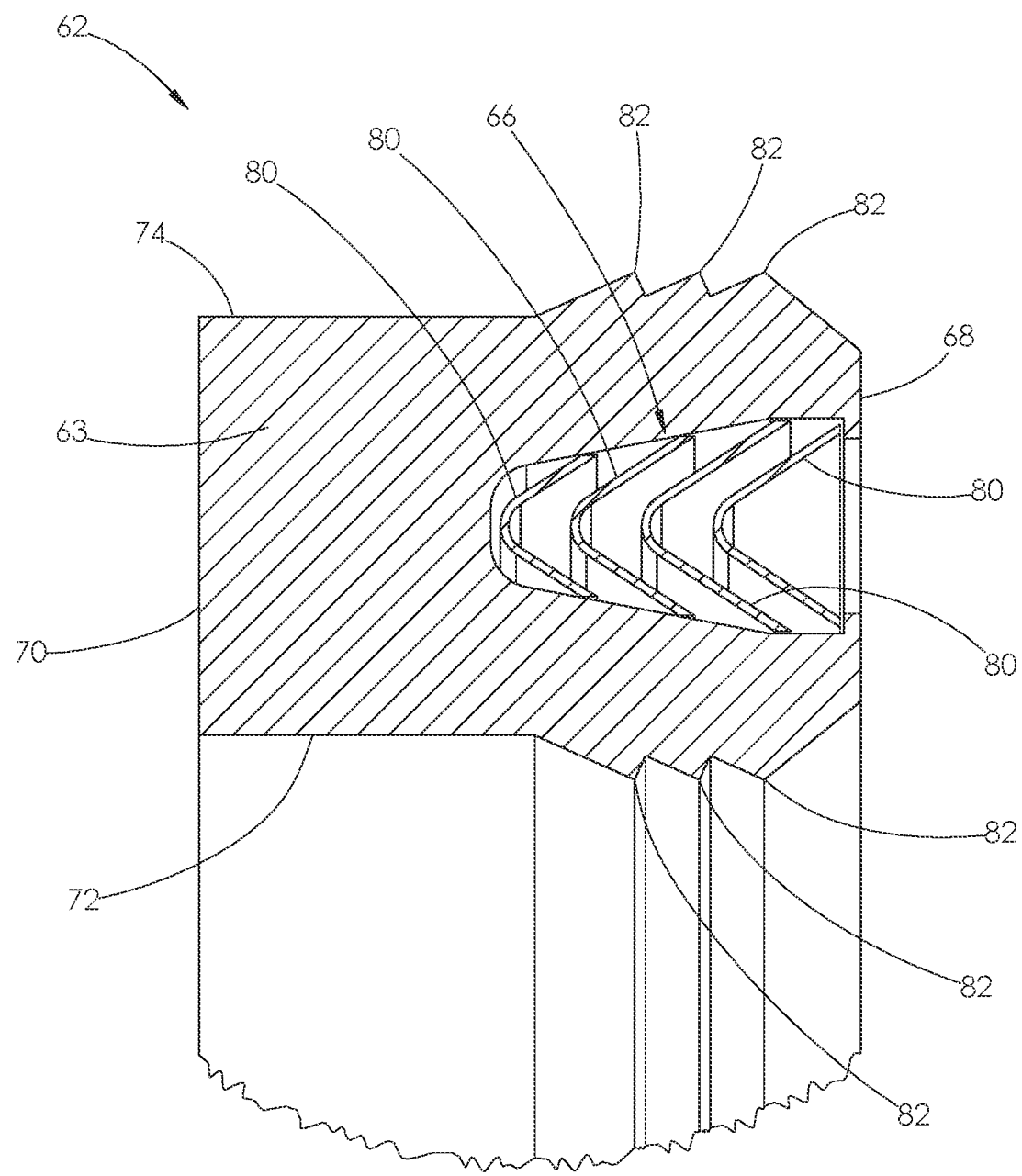
FIG. 9 is an enlarged view of area D shown in FIG. 8.

Continuing with FIG. 9, the energizing component 66 comprises a plurality of stacked metal pieces 80 having a V-shaped cross-section that function as a spring. Specifically, the packing seal 62 is known in the art as a multi-contact V-nested spring seal. In alternative embodiments, the energizing component may comprise other components known in the art that expand radially when compressed longitudinally. In further alternative embodiments, the energizing component may comprise one or more coiled springs configured to expand the seal regardless of any longitudinal compression.

Continuing with FIG. 9, the inner and outer surfaces 72 and 74 of the packing seal 62 comprise a plurality of seal lips 82. The seal lips 82 help effectuate sealing during operation. As the seal lips 82 wear over time, the energizing component 66 expands, pushing the lips 82 tighter against the plunger 54 and the wear ring 64.

Figure 14:
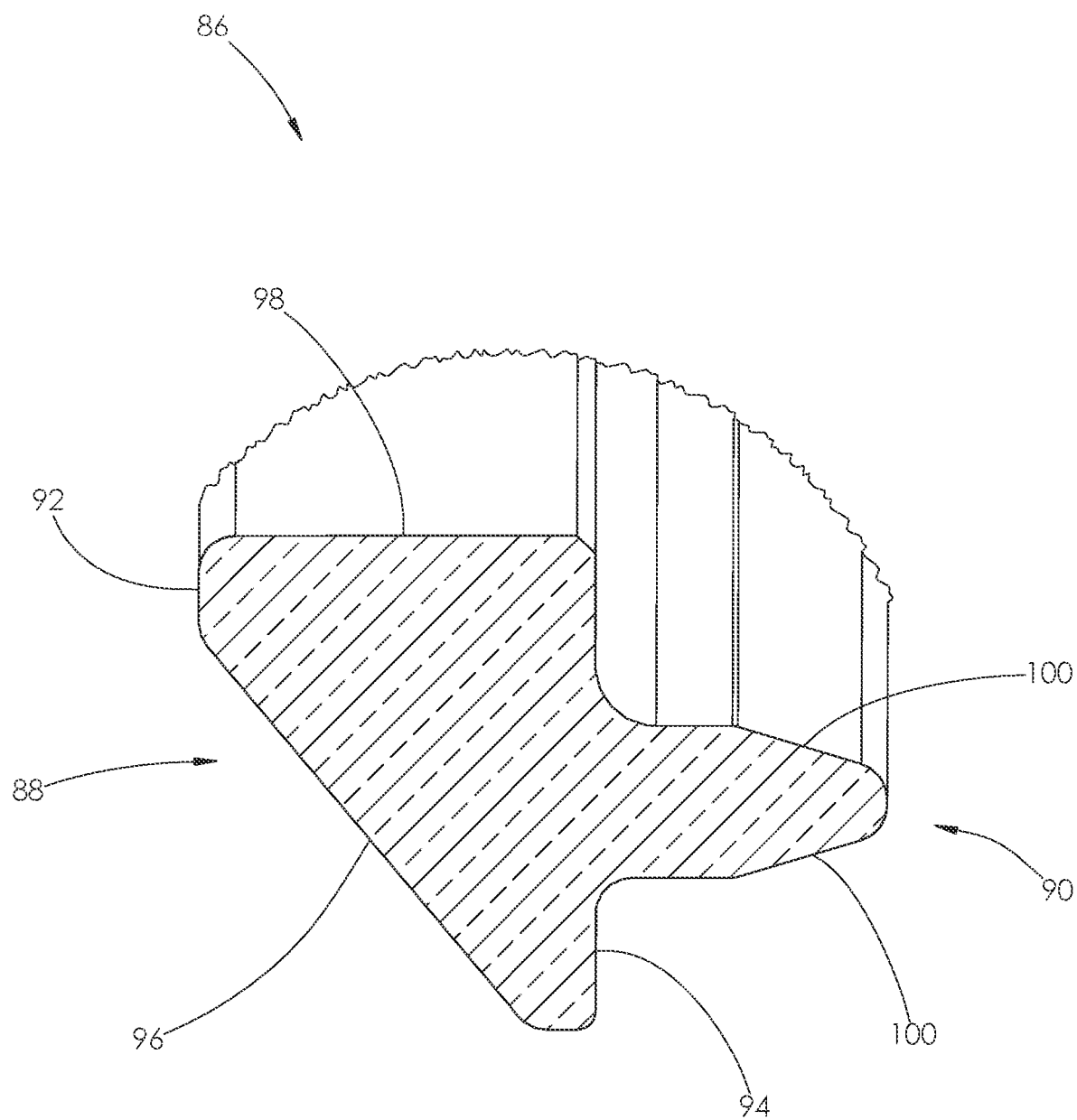
FIG. 14 is an enlarged view of area F shown in FIG. 13.
Figure 15:
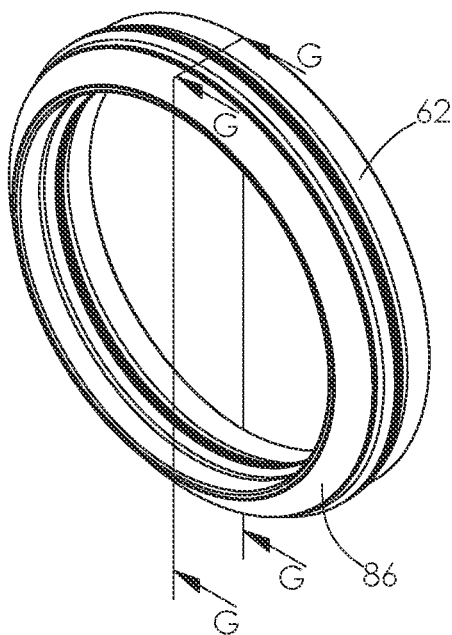
FIG. 15 is a front perspective view of the support element shown in FIG. 10 engaged with the packing seal shown in FIG. 5.
Figure 16:
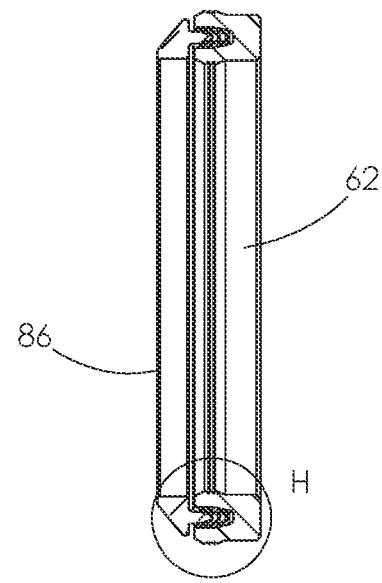
FIG. 16 is a cross-sectional view of the support element and packing seal shown in FIG. 15, taken along line G-G.
Figure 17:
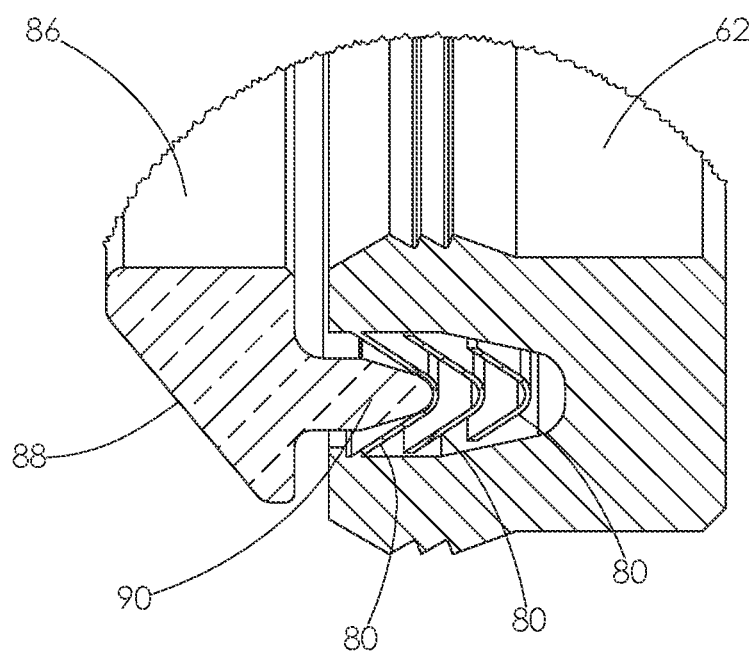
FIG. 17 is an enlarged view of area H shown in FIG. 15.

With reference to FIGS. 10-17, the packing seal assembly 60 further comprises a support element 86. The support element 86 comprises an annular base 88 joined to an annular protrusion 9o. The base 88 comprises opposed front and rear surfaces 92 and 94 joined by a tapered outer surface 96 and a cylindrical inner surface 98. The protrusion 90 projects from the rear surface 94 and has a tapered outer surface 100, as shown in FIG. 14. The rear surface 94 of the support element 86 is configured to engage the front surface 68 of the packing seal 62 such that the protrusion 90 projects into the energizing component 66, as shown in FIG. 17. In operation, the protrusion 90 helps keep the energizing component 66 expanded so as to maintain a tight seal against the plunger 54. However, the packing seal assembly 60 may be used without the support element 86, if desired.

Figure 4:
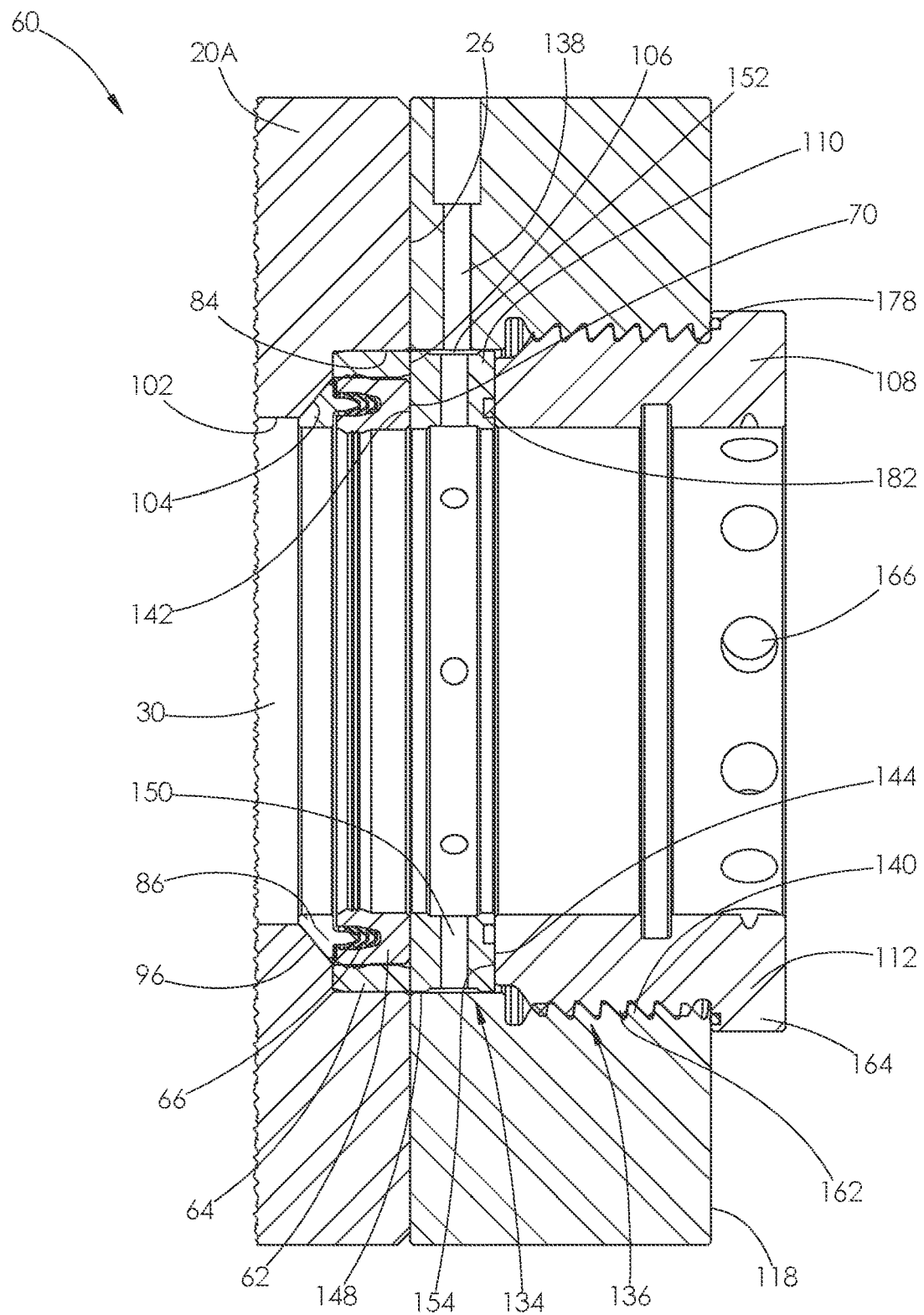
FIG. 4 is an enlarged view of area B shown in FIG. 3.

Turning back to FIGS. 3 and 4, the horizontal bore 30 comprises a counterbore 84 that opens on the rear surface 26 of the housing 20A. The counterbore 84 joins a uniform diameter section 102 of the horizontal bore 30 by a tapered surface 104, as shown in FIG. 4. The support element 86 is installed within the housing 20A such that the tapered outer surface 96 engages the tapered surface 104 of the housing 20A. The packing seal 62 and the wear ring 64 are installed within the counterbore 84 such that the wear ring 64 engages the walls of the counterbore 84 and the packing seal 62 engages the support element 86. When the components are installed within the housing 20A, the rear surface 70 of the packing seal 62 and a rear surface 106 of the wear ring 64 are flush with the rear surface 26 of the housing 20A. The housing 20 also comprises the counterbore 84 for receiving the support element 86, the wear ring 64 and the packing seal 62, as shown in FIG. 19.

With reference to FIGS. 2-4, 18, and 19, the packing seal 62 and wear ring 64 are held within the housing 20 or 20A by a rear retainer 108 having a metal ring 110 and a packing nut 112 installed therein. The rear retainer 108 is attached to the rear surface 26 of the housing 20 or 20A using a plurality of fasteners 114, as shown in FIGS. 3A, 18 and 19.

With reference to FIGS. 21-24, the rear retainer 108 comprises opposed front and rear surfaces 116 and 118 joined by an outer intermediate surface 120 and a central passage 122 formed therein. A plurality of passages 124 are formed in the rear retainer 108. Each passage 124 interconnects the front and rear surfaces 116 and 118. The retainer 108 is positioned on the rear surface 26 of the housing 20 or 20A such that the passages 124 align with a plurality of threaded openings 126 formed in the rear surface 26 of the housing 20 and 20A, as shown in FIGS. 3A and 19.

Figure 24:
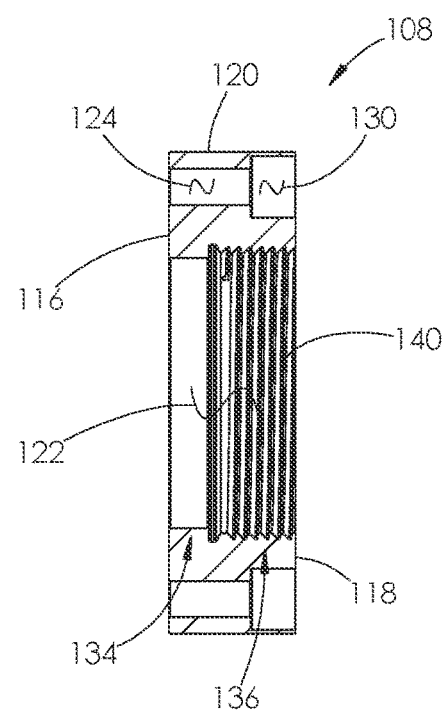
FIG. 24 is a cross-sectional view of the rear retainer shown in FIG. 23, taken along line I-I.
Figure 25:
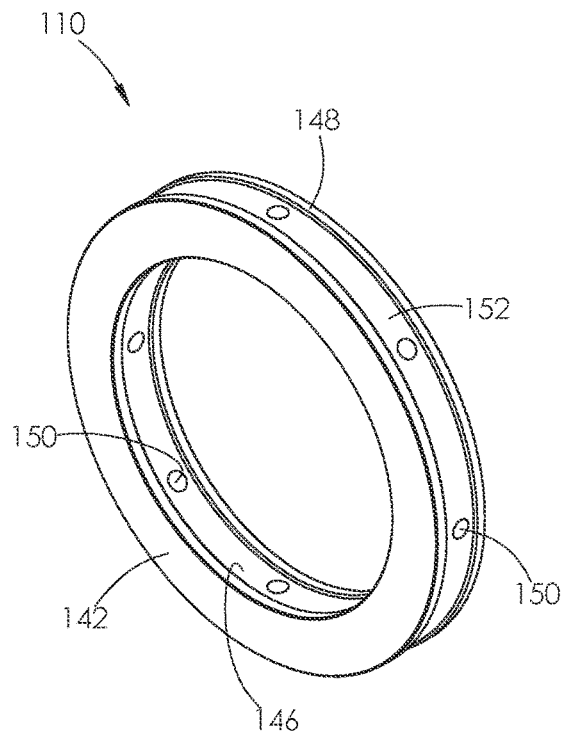
FIG. 25 is a front perspective view of the metal ring shown in FIGS. 2-4 and 18-20.
Figure 26:
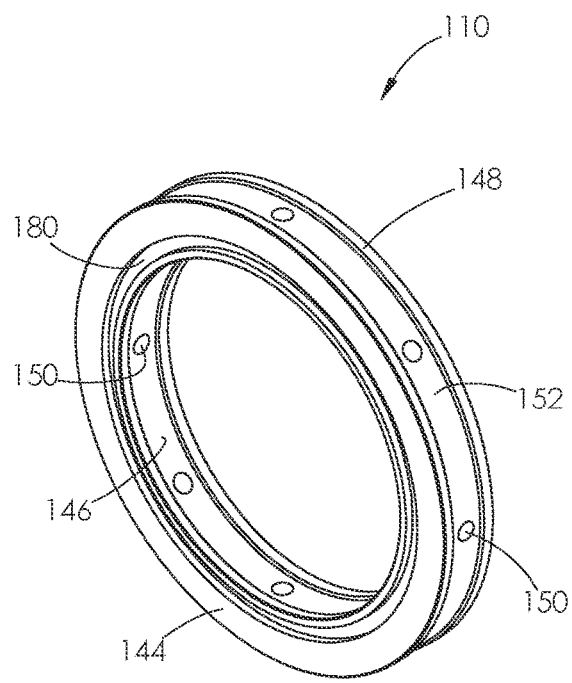
FIG. 26 is a rear perspective view of the metal ring shown in FIG. 25.
Figure 27:
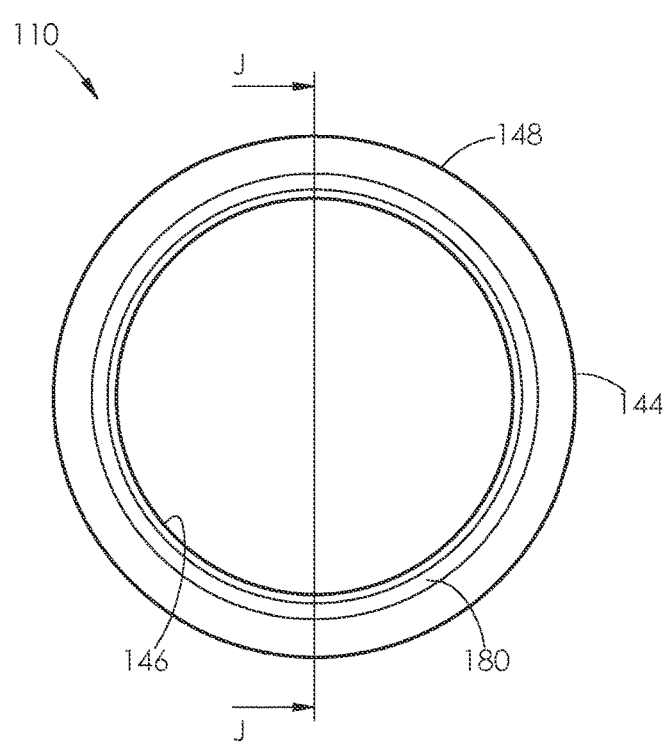
FIG. 27 is a rear elevational view of the metal ring shown in FIG. 25.

With reference to FIGS. 3A and 18-20, a fastener 114 is received within each pair of aligned openings and passages 126 and 124. When installed therein, a threaded end 128 of each fastener 114 is positioned within a counterbore 130 formed in each passage 124 adjacent the rear surface 118 of the retainer 108, as shown in FIGS. 3A, and 24. A threaded nut 132 is installed on each threaded end 128 and turned until the retainer 108 is held firmly against the rear surface 26 of the housing 20 or 20A. The nuts 132 are each fully disposed within each counterbore 130, such that no nut projects from the rear surface 118 of the retainer 108, as shown in FIGS. 3A and 20. In alternative embodiments, the passages 122 may not include the counterbore 130 and the nuts 132 may instead engage the rear surface 118 of the retainer 108.

Turning back to FIG. 24, the central passage 122 of the rear retainer 108 comprises a first section 134 joined to a second section 136. The first section 134 opens on the front surface 116 of the rear retainer 108, and the second section 136 opens on the rear surface 118 of the rear retainer 108. One or more lube ports 138 are also formed in the retainer 108. The lube port 138 interconnects the outer intermediate surface 120 and the first section 134 of the central passage 122, as shown in FIG. 4.

Continuing with FIGS. 4 and 24, internal threads 140 are formed in the walls of the second section 136 for receiving the packing nut 112. The walls surrounding the first section 134 of the central passage 122 are flat and configured to receive the metal ring 110. When the retainer 108 is attached to the housing 20, the central passage 122 aligns with the counterbore 84 formed in the housing 20A or 20, exposing the wear ring 64 and packing seal 62, as shown in FIG. 4.

With reference to FIGS. 25-28, the metal ring no comprises opposed front and rear surfaces 142 and 144 joined by inner and outer surfaces 146 and 148. A plurality of passages 150 are formed in the metal ring no that interconnect the inner and outer surfaces 146 and 148. The passages 150 open into an annular channel 152 formed in the outer surface 148 of the metal ring 110.

Continuing with FIG. 4, when the metal ring 110 is installed within the central passage 122, the front surface 142 of the metal ring 110 engages the rear surface 70 of the packing seal 62 and the rear surface 106 of the wear ring 64, and the outer surface 148 engages the first section 134 of the central passage 122. The lube port 138 formed in the retainer 108 aligns with the annular channel 152. During operation, lubricant is supplied to the fluid end section 16 through the lube port 138. Lubricant passes through the lube port 138 and into the annular channel 152 and eventually through the passages 150. Lubricant flowing through the passages 150 contacts and lubricates an outer surface of the reciprocating plunger 54.

With reference to FIGS. 2-4, 18-20, and 29-32, the metal ring 110 is held within the retainer 108 by the packing nut 112. The packing nut 112 comprises opposed front and rear surfaces 154 and 156 joined by an outer intermediate surface 158 and a central passage 160 formed therein. The intermediate surface 158 comprises a threaded section 162 joined to a flange 164. The threaded section 162 is configured to mate with the internal threads 140 formed in the second section 136 of the central passage 122 of the rear retainer 108, as shown in FIG. 4.

Figure 32:
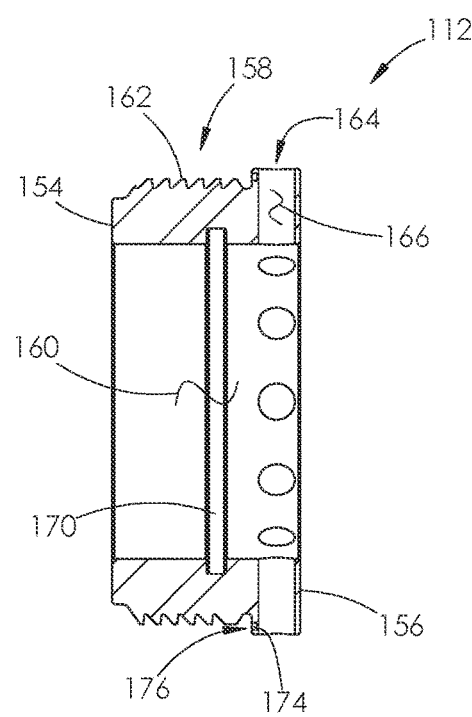
FIG. 32 is a cross-sectional view of the packing nut shown in FIG. 31, taken along line 32.

Continuing with FIGS. 4 and 32, a plurality of openings 166 are formed in the flange 164 of the packing nut 112. Each opening 166 interconnects the outer intermediate surface 158 and the central passage 160. The openings 166 are configured to receive a tool used to turn the packing nut 112 within the retainer 108. The packing nut 112 is turned within the central passage 122 until the front surface 154 of the packing nut 112 tightly engages the rear surface 144 of the metal ring 110 and the flange 164 abuts the rear surface 118 of the retainer 108, as shown in FIG. 4. When tightly engaged, the front surface 142 of the metal ring 110 likewise tightly engages the rear surface 70 of the packing seal 62 and the rear surface 106 of the wear ring 64, thereby retaining the packing seal 62 and wear ring 64 within the housing 20 or 20A.

Continuing with FIGS. 2, 4, and 32, a first groove 170 is formed within the walls of the central passage 160 of the packing nut 112 for housing a first seal 172, as shown in FIG. 2. The first seal 172 engages an outer surface of the plunger 54 and prevents fluid from leaking between the components, as shown in FIG. 2. A second groove 174 is formed in a front surface 176 of the flange 164 of the packing nut 112 for housing a second seal 178, as shown in FIG. 4. When the flange 164 abuts the rear surface 118 of the retainer 108, the second seal 178 engages the rear surface 118 of the retainer 108. The second seal 178 provides friction between the retainer 108 and the packing nut 112 to help prevent the packing nut 112 from backing out of the retainer 108 during operation.

Figure 28:
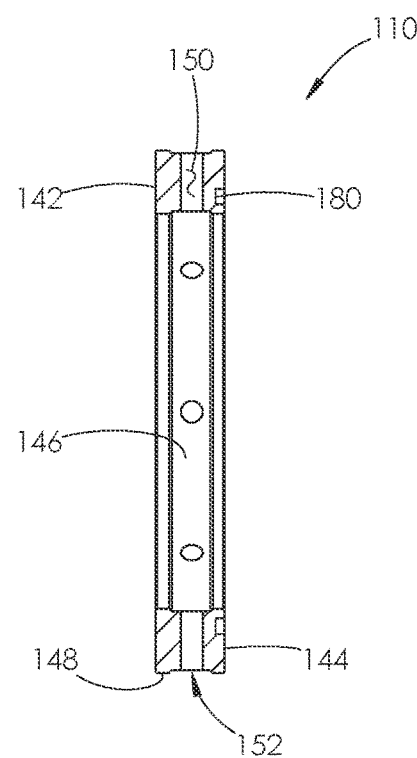
FIG. 28 is a cross-sectional view of the metal ring shown in FIG. 27, taken along line J-J.
Figure 29:
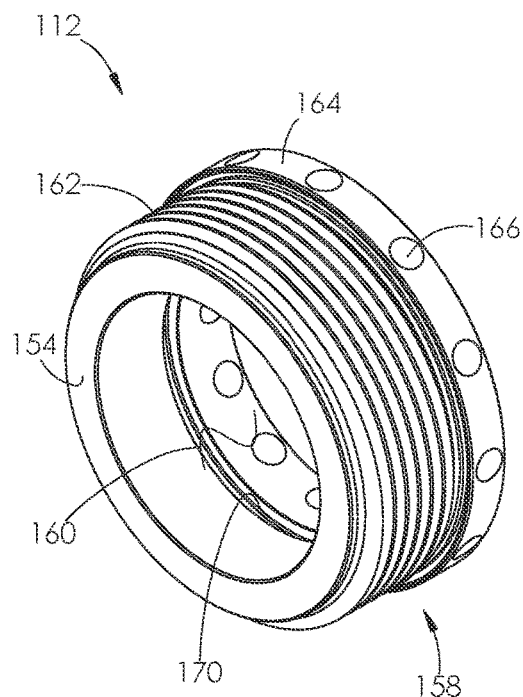
FIG. 29 is a front perspective view of the packing nut shown in FIGS. 2-4 and 18-20.
Figure 30:
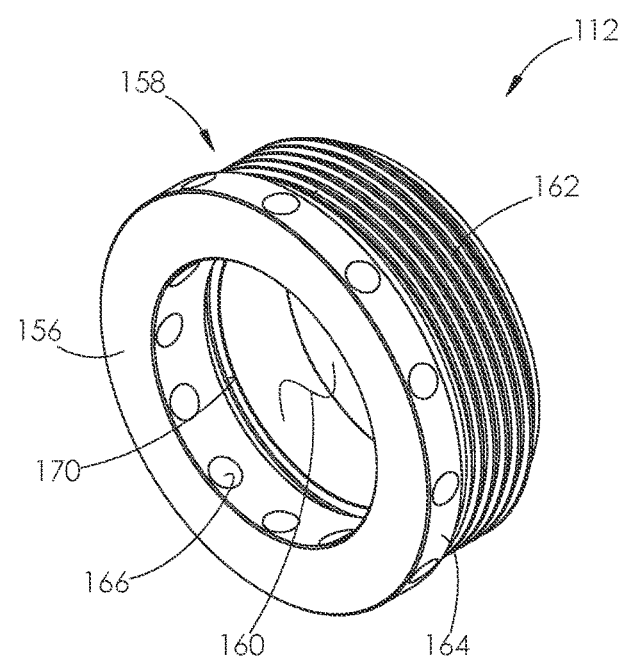
FIG. 30 is a rear perspective view of the packing nut shown in FIG. 29.
Figure 31:
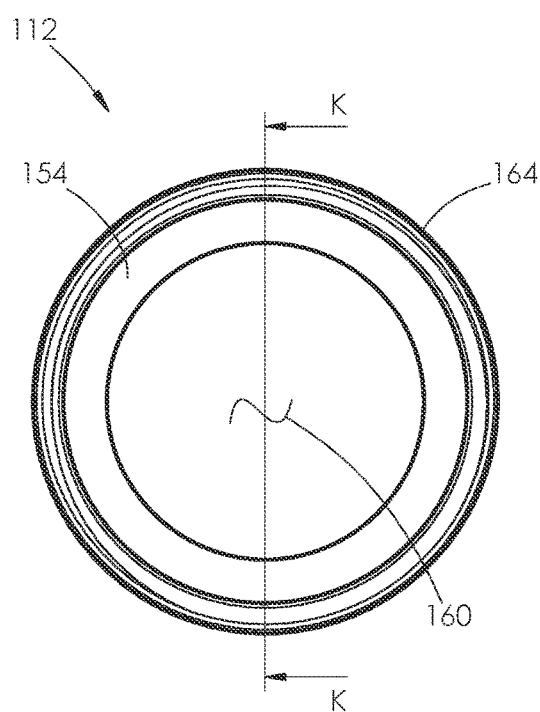
FIG. 31 is a front elevational view of the packing nut shown in FIG. 29.

Similarly, a groove 180 is formed in the rear surface 144 of the metal ring 110 for housing a seal 182, as shown in FIGS. 4 and 28. The seal 182 prevents fluid from leaking between the metal ring 110 and packing nut 112 during operation. The seal 182 further provides friction between the metal ring no and the packing nut 112 to help prevent the packing nut 112 from backing off during operation.

Figure 33:
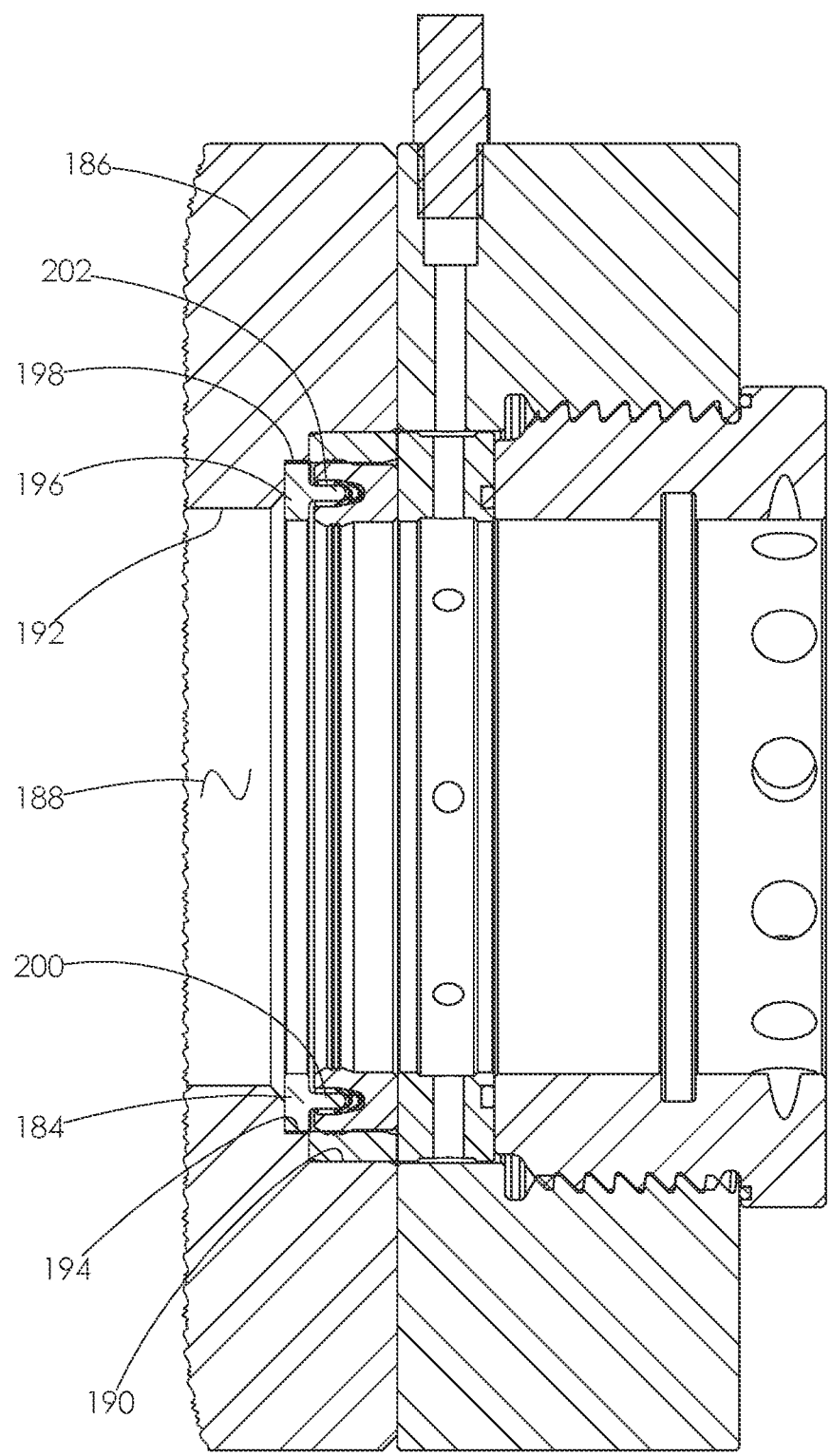
FIG. 33 is a cross-sectional and enlarged view of another embodiment of a packing seal assembly.

Turning to FIG. 33, another embodiment of a support element 184 and housing 186 are shown. The housing 186 is identical to the housing 20A, but it does not include the tapered surface 104, shown in FIG. 4. Instead, the walls surrounding a horizontal bore 188 of the housing 186 comprise a first counterbore 190 joined to a uniform diameter section 192 by a second counterbore 194. The support element 184 is identical to the support element 86, but a base 196 of the element 184 has a rectangular shaped outer surface 198 configured to be installed within the second counterbore 194 formed in the housing 186. Additionally, a protrusion 200 projecting from the base 196 of the support element 184 has a generally rectangular or uniform diameter outer surface 202, instead of the tapered outer surface 100, shown in FIG. 14. The support element 184 functions in the same manner as the support element 86.

The packing seal assembly 60 disclosed herein may be used with other embodiments of fluid end sections not specifically disclosed herein. For example, the packing seal assembly 60 may be used with the fluid end sections disclosed in U.S. patent application Ser. No. 17/884,712, previously incorporated herein by reference, and U.S. patent application Ser. No. 17/550,552, authored by Thomas et al., the entire contents of which are incorporated herein by reference. Alternatively, the packing seal assembly 60 may be used with traditional block fluid ends known in the art, such as those disclosed in U.S. Pat. No. 10,941,765, issued to Nowell et al., the entire contents of which are incorporated herein by reference. In further embodiments, the packing seal assembly 60 may be used with other embodiments of retaining systems, such as those disclosed in U.S. patent Ser. No. 17/685,936, authored by Foster et al., the entire contents of which are incorporated herein by reference.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. A fluid end, comprising: a housing having a longitudinal axis and opposed front and rear surfaces joined by an outer intermediate surface; a bore formed within the housing and interconnecting the front and rear surfaces, the bore extending along the longitudinal axis of the housing; a retainer attached to the rear surface of the housing by a first plurality of fasteners; a reciprocating plunger disposed within the bore and the retainer; one and only one packing seal installed within the housing and engaging an outer surface of the plunger; the housing comprises a first section joined to a second section by a second plurality of fasteners.

2. The fluid end of claim 1, further comprising:
 a wear ring installed within the housing and surrounding the one and only one packing seal.

3. The fluid end of claim 1, in which the retainer comprises a threaded inner surface, the fluid end further comprising:
 a packing nut installed within the retainer and engaging the one and only one seal.

4. The fluid end of claim 1, further comprising:
 a metal ring installed within the retainer and interposed between the one and only one packing seal and the packing nut, the metal ring comprising one or more lube passages.

5. The fluid end of claim 1, in which the one and only one packing seal has opposed first and second surfaces joined by inner and outer intermediate surfaces, and comprises:
 an energizing component installed within the seal and configured to expand the inner and outer intermediate surfaces during operation.

6. The fluid end of claim 5, in which the energizing component comprises a spring.

7. The fluid end of claim 5, further comprising:
 an annular component installed within the housing and comprising a projecting portion, the projecting portion engaging the energizing component.

8. The fluid end of claim 7, in which the projecting portion has a tapered outer surface.

9. The fluid end of claim 1, in which no threads are formed in the housing that surround and face the plunger.

10. The fluid end of claim 7, in which the annular component abuts an annular shoulder formed in the housing and surrounding the horizontal bore.

11. A fluid end assembly, comprising:
 a plurality of the fluid ends of claim 1; in which each of the fluid ends is formed as an individual fluid end section; and in which the plurality of fluid end sections are positioned in a side-by-side relationship; and
 an intake manifold in fluid communication with each of the plurality of fluid end sections.

12. The fluid end section of claim 1, in which the first section comprises at least one discharge bore, and the second section comprises the one and only one packing seal.

13. The fluid end of claim 12, in which the first section comprises a plurality of openings, each opening configured to receive a stay rod, each stay rod configured to attach to a power end.

* * * * *

UNITED STATES PATENT AND TRADEMARK OFFICE
CERTIFICATE OF CORRECTION

PATENT NO. : 11,946,465 B2
APPLICATION NO. : 17/884757
DATED : April 2, 2024
INVENTOR(S) : Barnett et al.

It is certified that error appears in the above-identified patent and that said Letters Patent is hereby corrected as shown below:

In the Specification

Column 3, Line 28, please delete "4o" and substitute therefor "40".
Column 3, Line 31, please delete "5o" and substitute therefor "50".
Column 3, Line 37, please delete "3o" and substitute therefor "30".
Column 3, Line 39, please delete "4o" and substitute therefor "40".
Column 4, Line 58, please delete "9o" and substitute therefor "90".
Column 5, Line 41, after "3A," please insert --20--.
Column 6, Line 1, please delete "no" and substitute therefor "110".
Column 6, Line 4, please delete "no" and substitute therefor "110".
Column 6, Line 66, please delete "no" and substitute therefor "110".

Signed and Sealed this
Seventh Day of May, 2024

Katherine Kelly Vidal
*Director of the United States Patent and Trademark Office*